United States Patent
Sato

(10) Patent No.: US 6,636,157 B1
(45) Date of Patent: *Oct. 21, 2003

(54) WIRELESS REMOTE CONTROL SYSTEM FOR CONTROLLING AN APPLIANCE

(75) Inventor: Kazuhiro Sato, Tokyo (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1188 days.

(21) Appl. No.: 08/773,173

(22) Filed: Dec. 27, 1996

Related U.S. Application Data

(63) Continuation of application No. 08/240,526, filed on May 10, 1994, now abandoned.

(30) Foreign Application Priority Data

May 14, 1993 (JP) .............................................. 5-135076

(51) Int. Cl.[7] .............................................. H04B 10/00
(52) U.S. Cl. ............................. 340/825.22; 340/825.24; 340/825.69; 340/825.72
(58) Field of Search ....................... 340/825.22, 825.24, 340/825.69, 825.72, 825.71, 825.73, 825.57; 348/734; 364/146; 359/142, 145, 146; 341/176; 455/352, 151.1, 151.2, 151.4; 345/169, 507

(56) References Cited

U.S. PATENT DOCUMENTS

| | | | |
|---|---|---|---|
| 4,482,947 A | * 11/1984 | Zato et al. ............ 340/825.76 X |
| 4,581,645 A | * 4/1986 | Beyers, Jr. .................. 348/705 |
| 4,703,359 A | * 10/1987 | Rumbolt et al. .... 340/825.69 X |
| 4,709,412 A | * 11/1987 | Seymour et al. ............. 359/145 |
| 4,771,283 A | * 9/1988 | Imoto ................. 340/825.73 X |
| 4,774,511 A | * 9/1988 | Rumbolt et al. ....... 340/825.69 |
| 4,864,647 A | 9/1989 | Harrington |
| 4,965,557 A | * 10/1990 | Schepers et al. ............ 348/734 |
| 4,989,081 A | * 1/1991 | Miyagawa et al. . 340/825.72 X |
| 5,109,222 A | 4/1992 | Welty |
| 5,132,679 A | * 7/1992 | Kubo et al. ......... 340/825.24 X |
| 5,142,397 A | * 8/1992 | Dockery ...................... 359/145 |
| 5,182,551 A | * 1/1993 | Goto ...................... 340/825.24 |
| 5,182,552 A | * 1/1993 | Paynting ............ 340/825.24 X |
| 5,243,430 A | * 9/1993 | Emmons ............ 340/825.69 X |
| 5,255,180 A | * 10/1993 | Shinoda et al. ..... 340/825.69 X |
| 5,367,316 A | * 11/1994 | Ikezaki .................... 348/734 X |
| 5,383,044 A | * 1/1995 | Borchardt et al. .. 340/825.72 X |
| 5,416,535 A | * 5/1995 | Sato et al. .............. 348/734 X |
| 5,418,527 A | * 5/1995 | Yashiro ................. 340/825.24 |
| 5,438,325 A | * 8/1995 | Nishigaki et al. ... 340/825.25 X |
| 5,473,317 A | * 12/1995 | Inomata et al. ..... 340/825.72 X |
| 5,534,865 A | * 7/1996 | Kriegsman et al. ..... 359/142 X |
| 5,554,979 A | * 9/1996 | Kohar et al. ........... 340/825.72 |

FOREIGN PATENT DOCUMENTS

| EP | 0 354 459 A1 | 2/1990 |
| EP | 0 383 277 A2 | 8/1990 |

\* cited by examiner

*Primary Examiner*—Michael Horabik
(74) *Attorney, Agent, or Firm*—Rader, Fishman, & Grauer PLLC; Ronald P. Kananen, Esq.

(57) ABSTRACT

A remote control system included a remote commander and a control apparatus. The remote commander includes a first transmitting unit for transmitting a first command signal modulated based on a first carrier frequency by a first radio transmission medium in response to an input operation. The control apparatus includes a receiving unit for receiving a radio transmission signal transmitted from the remote commander by a first radio transmission unit, and a second transmitting unit for transmitting a second command signal modulated based upon a second carrier frequency by a second radio transmission medium. This second command signal is to control an operation of an electronic appliance designated by the remote commander among a plurality of electronic appliances based upon an output signal derived from the receiving unit. A plurality of electronic appliances have such a receiving unit for receiving the second command signal outputted from the second transmitting unit of the control apparatus, and operations of these electronic appliances are controlled in response to the output signal issued from this receiving unit.

3 Claims, 18 Drawing Sheets

FIG. 16A comand waveform SR₁ 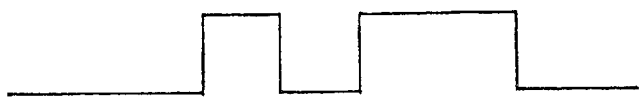
FIG. 16B 400KHz carrier SR₂ 
FIG. 16C modulated waveform SR₃ 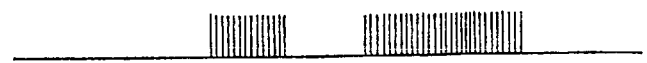
FIG. 16D BPF output (fo=400KHz) SC₁ 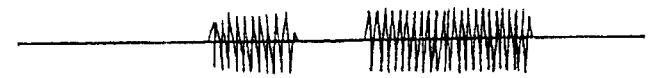
FIG. 16E waveform-shaped output SC₂ 
FIG. 16F comand waveform SC₃ 
FIG. 16G 400KHz carrier SC₄ 
FIG. 16H modulated waveform SC₅ 
FIG. 16I on side of appliance to be operated BPF(fo=40KHz) output 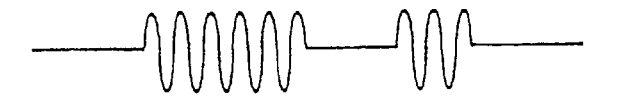
FIG. 16J waveform-shaped output 

WIRELESS REMOTE CONTROL SYSTEM FOR CONTROLLING AN APPLIANCE

This application is a continuation of application Ser. No. 08/240,526 filed May 10, 1994 now abandoned.

BACKGROUND

1. Field of the Invention

The present invention generally relates to a remote control system. More specifically, the present invention is directed to a remote control system which uses wireless communications to issue command signals.

2. Background of the Invention

Remote control operations are available for various sorts of electronic appliances such as audio/visual appliances, e.g., VTRS, television receivers, and CD players, and also air conditioners, and illumination devices.

Since it is cumbersome to use a dedicated remote commander for each of these devices, methods of operating a large number of appliances by way of a single remote controller have been proposed. One of these single remote commander controlling methods uses a central controller.

In FIG. 1, there is shown an example of a remote control system which employs a central controller. This example is adapted to an A/V (audio/visual) system. The A/V system is so constructed that a VTR 2, a CD player 3, a TV tuner 4, and an optical video disk player (simply referred to a "video disk player" hereinafter) 5 are connected via an A/V selector amplifier 6 to a CRT monitor 7 and a speaker 8.

That is, outputs of picture signals SV from the respective VTR 2, TV tuner 4, and video disk player 5 are supplied to a picture input changing unit 6a of an A/V selector amplifier 6 and are selected by the picture input changing unit 6a. The picture signal SV selected by the picture input changing unit 6a, is then supplied to the CRT monitor 7 to output a picture.

L-channel and R-channel audio signals ($SA_L$, $SL_R$) outputted from the respective appliances of the VTR 2, CD player 3, TV tuner 4, and video disk player 5 are supplied to an audio input by an audio input changing unit 6b. Following this, the picture signal selected by the audio input changing unit 6b is amplified by an amplifier unit 6c, and volume controls are performed in the amplifier unit 6c. The resultant audio signals are supplied to an L-channel speaker 8 and a R-channel speaker 8 for outputting sound.

Here, there are provided: (a) a remote controller "R" equipped with operation keys to operate various appliances in such an A/V system; and (b) a central controller 1 capable of receiving a command signal from this remote commander R. The remote commander R transmits an infrared command signal modulated with a predetermined carrier frequency which is read by an internal microcomputer of the central controller. An infrared ray receiving unit 1a is arranged with this central controller and is capable of receiving the infrared command signal transmitted by the remote command R. central controller 1 is connected via control signal lines "C" to the VTR 2, CD player 3, TV tuner 4, video disk player 5, A/V selector amplifier 6, and CRT monitor 7, respectively. The respective appliances such as the VTR 2, CD player 3, TV tuner 4, video disk player 5, A/V selector amplifier 6, and CRT monitor 7, can thus can execute operations in response to such command signals inputted via the control signal lines "C" and are fetched by system controllers employed in the respective appliances.

The central controller 1 is arranged as shown in, for instance, FIG. 2. That is, an infrared signal received by the infrared receiving unit 1a is converted into an electric signal. This electric signal is waveform-shaped and then demodulated to obtain a demodulated signal which is supplied as a command signal to a control unit 1b. Reference numeral $1b_1$ denotes a CPU in the control unit 1b, reference numeral $1b_2$ indicates a ROM for storing various sorts of command signals and operation programs, while reference numeral $1b_3$ denotes a RAM for storing a command signal and the like, for instance, which is produced by a user. It should be noted that reference numeral $1b_4$ indicates a clock oscillator for producing an operation clock of the control unit 1b.

The CPU $1b_1$ of the control unit 1b reads out either one, or a plurality of required command signals from a ROM $1b_2$ or a RAM $1b_3$ in accordance with the operation program based upon the command signal supplied from the infrared ray receiving unit 1a, and also outputs the read command signals from an output unit 1c to an appliance responding to the command signal. The command signal, or signals outputted from the output unit 1c are supplied via the control signal line C to the respective appliances, so that the respective appliances are operated in accordance with the appropriate command signal.

In the A/V system shown in FIG. 1, for example, when a user manipulates the fast forward key for VTR 2 by way of the remote commander R during the reproducing operation of the VTR 2, the central controller 1 receives this command signal and outputs a command signal calling for the fast forward operation to the VTR 2 in response to the received command signal, so that this fast forward operation is executed in the VTR 2.

Also, the central controller 1 may perform various interlocking operation controls in order to simplify user's operation. For instance, CD reproducing play may be enjoyed by merely operating such an operation key indicative of "CD" by way of the remote commander R. That is, upon receipt of the command signal of "CD" transmitted from the remote commander R, the central controller 1 sends a power-ON command to the A/V selector amplifier 6, and further sends such a command signal for changing the audio input changing unit 6b into a CD input terminal. Furthermore, subsequently, the central controller 1 transmits a power-ON command to the CD player 3, and then transmits a CD-reproduction command. Under this control, a CD reproduced sound is generated by the speakers 8.

As previously explained, when the central controller 1 receives one command signal sent from the remote controller R, the central controller 1 executes a series of control operation with respect to the relevant appliance, so that operations executed by the user are greatly simplified.

However, there is a problem that when such a central controller 1 is utilized, the respective appliances must be connected via the control signal lines "C", and thus the system setting is very cumbersome. The connecting operations and modifications in the connecting operations are troublesome because the number of signal wiring lines is increased.

Furthermore, to perform connections hardware/software processing arrangements capable of processing the control input terminals corresponding to the respective appliances and the command signals derived from the control input terminals, are necessary. As a result, there is a limitation to the number of appliances which can be utilized in such an A/V system. Another problem is that A/V appliances which are manufactured by different manufactures cannot be used.

To solve these problems and obviate the wiring work involved with the control signal lines C, it has been proposed to use infrared command signals which are transmitted not only between the remote controller R to the central controller 1, but also between the central controller 1 to the respective appliances.

However, the infrared command signals usually have frequencies on the order of 30 to 60 KHz. As a result, if this transmission method is executed without any modification, then the infrared command signal transmitted from the remote commander R to the central controller 1 would interfere with the infrared command signal outputted from the central controller 1, resulting in signal interference.

As a consequence, it is required to temporally shift the transmission of the infrared command signal from the remote commander R to the central controller 1 with respect to the transmission of the infrared command signal from the central controller 1 to the respective appliances. For instance, the central controller 1 should execute such a process for outputting the command signal to the relevant appliance after confirming that a user releases the operation key of the remote commander R, and no command signal is supplied from the remote commander R.

However, to execute such a process, the processing operations executed by the microcomputer of the central controller 1 are numerous and there is a problem that a heavy software workload is induced resulting in a lengthy time delay between the user manipulating the remote commander R and the relevant appliance actually performing the required operation in response to this key operation.

SUMMARY OF THE INVENTION

It is, therefore, an object of the present invention to provide a remote control system which can solve the above-described problems.

According to a first aspect of the present invention, a remote control system includes a remote commander and a control apparatus. The remote commander transmits a command signal via a first radio (wireless) transmission medium. The control includes a receiving unit for receiving a transmission signal transmitted from the remote commander via the first radio transmission medium, and a transmitting unit for transmitting a command signal via a second radio (wireless) transmission medium so as to operate a preselected appliance among a plurality of appliances in response to the output signal derived from the receiving unit. It should be noted that the term "radio" is, in this specification, used in its broadest sense and encompasses wireless communications in at least the electromagnetic spectrum including infrared radiation.

According to another aspect of the present invention, a remote control system includes a remote commander and a control apparatus. The remote commander includes a first transmitting unit for transmitting a first command signal modulated using a first carrier frequency and which is transmitted using a first radio transmission medium in response to an input operation. The control apparatus includes a receiving unit for receiving the radio transmission signal transmitted from the remote commander and a second transmitting unit for transmitting a second command signal modulated using a second carrier frequency and which is transmitted using a second different radio transmission medium. This second command signal controls the operation of an electronic appliance designated by the remote commander among a plurality of electronic appliances, based upon an output signal derived from the receiving unit. A plurality of electronic appliances each have such a receiving unit for receiving the second command signal outputted from the second transmitting unit of the control apparatus, and operations of these electronic appliances are controlled in response to the output signal issued from this receiving unit.

In accordance with a third aspect of the present invention, there is provided a remote control system including a remote commander, a control unit, a selecting apparatus, and an output apparatus. The remote commander includes a first transmitting unit for transmitting a first command signal modulated using a first carrier frequency via a first radio transmission medium in response to an input operation. The control apparatus includes a first receiving unit for receiving a radio transmission signal transmitted from the remote commander by the first radio transmission medium, and a second transmitting unit for transmitting a second command signal modulated using a second carrier frequency via a second radio transmission medium in response to the output signal derived from the first receiving unit. The selecting apparatus includes a selecting circuit for selecting output signals derived for the first and second electronic appliances, and a second receiving unit for receiving the radio transmission signal transmitted from the control apparatus by the second radio transmission medium. The first and second electronic appliances each has a receiving unit for receiving the radio transmission signal transmitted from the control apparatus by the second radio transmission medium. The operations of the first and second electronic appliances are controlled based upon the output signal derived from the receiving unit. The selecting apparatus controls the selecting circuit in response to the signal derived from the second receiving unit. The output signal derived via the selecting apparatus from either the first electronic appliance, or the second electronic appliance is supplied to the output apparatus.

A further aspect of the present invention obviates the need to connect the controller with the respective appliances by way of the connection cables. As a result, cumbersome work is no longer required during the system setting operation. Furthermore, in accordance with the remote control system of the present invention, interference between the first command signal and the second command signal can be avoided by either differing the first radio transmission medium from the second radio transmission medium, or by setting the carrier frequencies to frequencies which do not interfere with each other.

BRIEF DESCRIPTION OF THE DRAWINGS

For a better understanding of the present invention, reference is made of the detailed description to be read in conjunction with the accompanying drawings, in which:

FIGS. 16A to 16J show waveform diagrams used to explain a command transmitting/receiving operation of the second embodiment, FIG. 16A representing a command signal SR1 of a remote commander, FIG. 16B showing a carrier SR2 of the remote commander, FIG. 16C indicating a signal SR3 outputted from an AND gate, FIG. 16D denoting an output signal SC1 derived from a bandpass filter of the central controller, FIG. 1GE showing an output signal SC2 derived from a waveform shaping circuit, FIG. 16F representing a waveform of a command signal outputted from a control circuit, FIG. 16G indicating a waveform of a carrier outputted from an oscillator; FIG. 16H denoting an output signal derived from an AND gate, FIG. 16I showing an output signal derived from a bandpass filter of the infrared ray receiving unit of the appliance under control, and FIG. 16J indicates a command signal produced after the waveform of the appliance under control has been shaped;

DETAILED DESCRIPTION OF THE INVENTION

Referring now to FIG. 3 to FIG. 12, a first embodiment of the present invention will be described.

Figure 1:
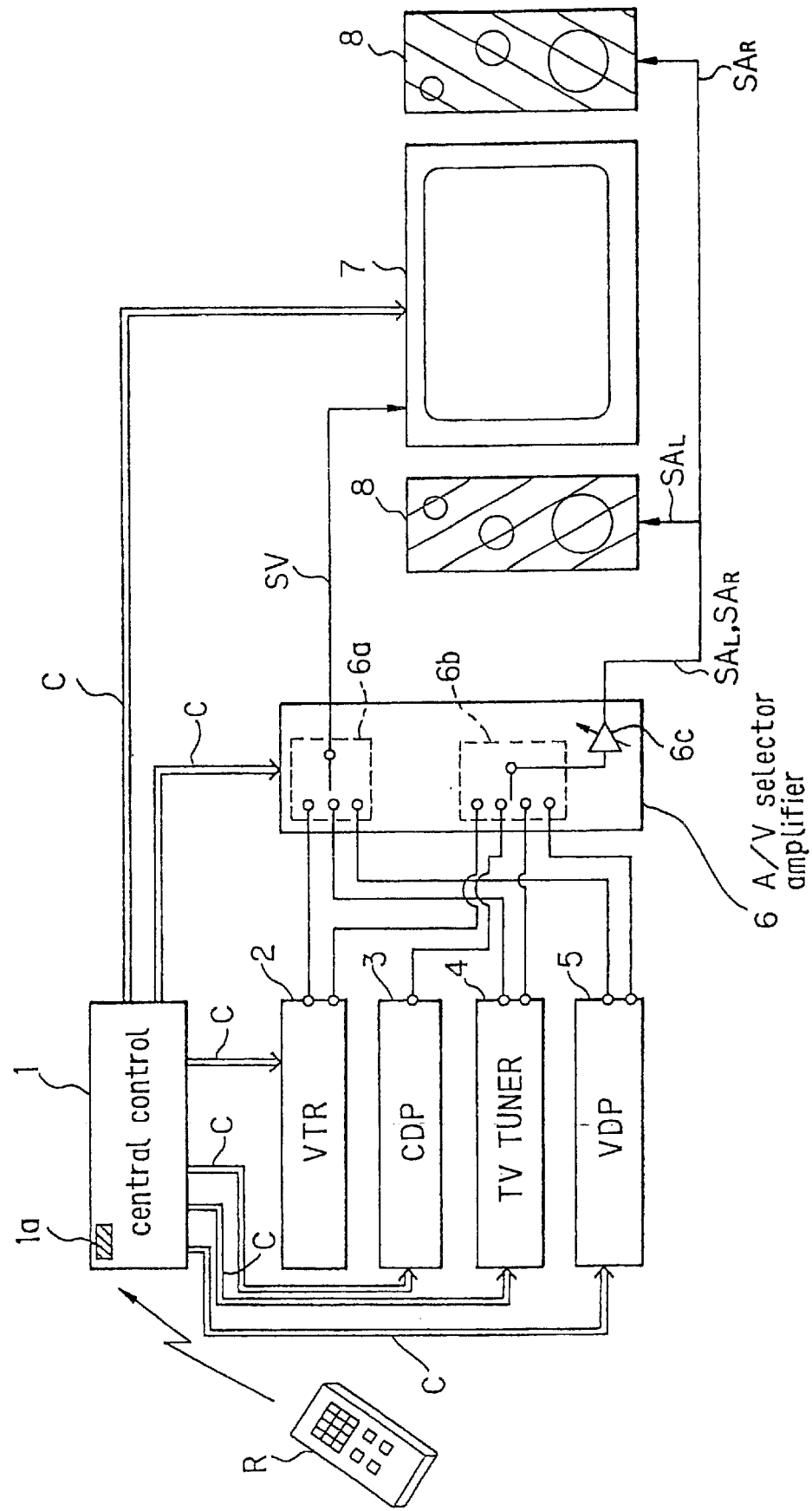
FIG. 1 is a schematic block diagram of a remote control system as a basic idea of the present invention.
Figure 2:
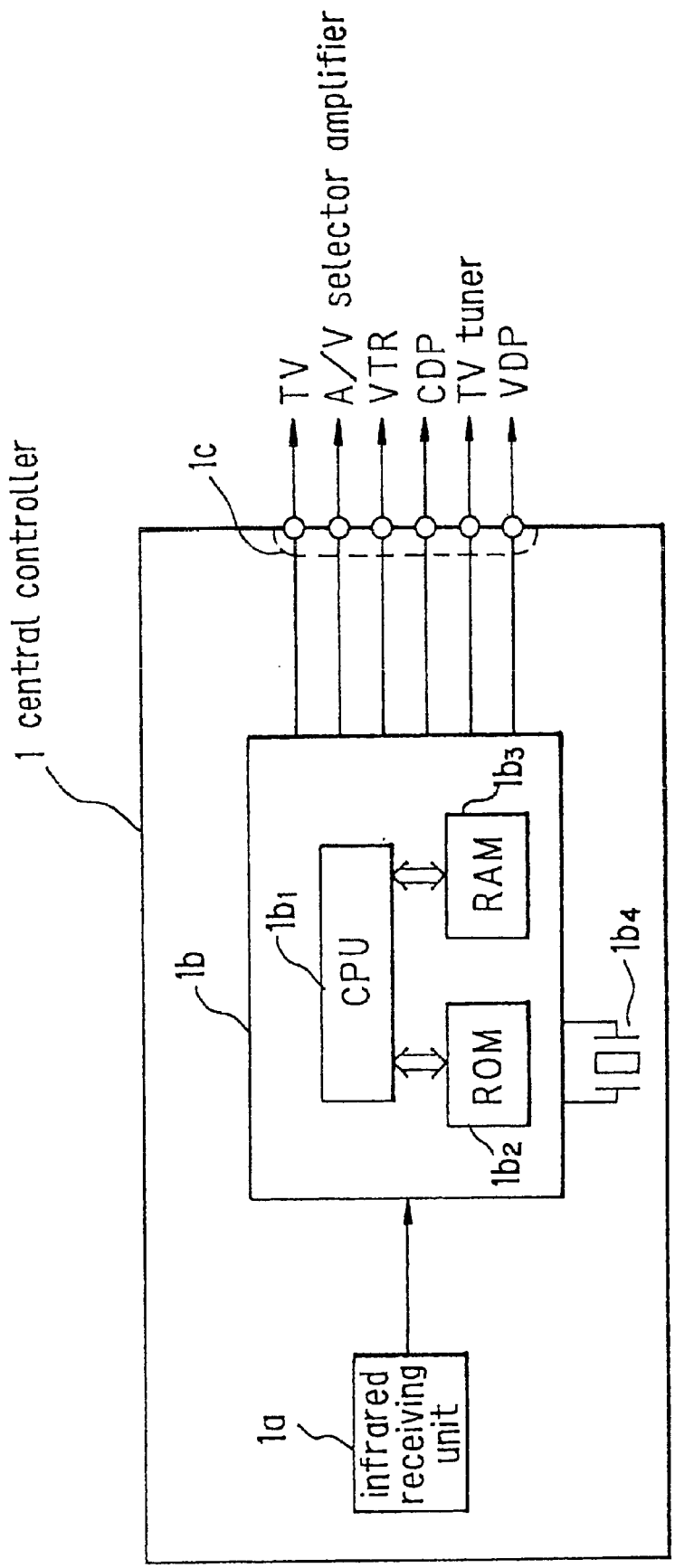
FIG. 2 is a schematic block diagram of a central controller of the remote control system.
Figure 3:
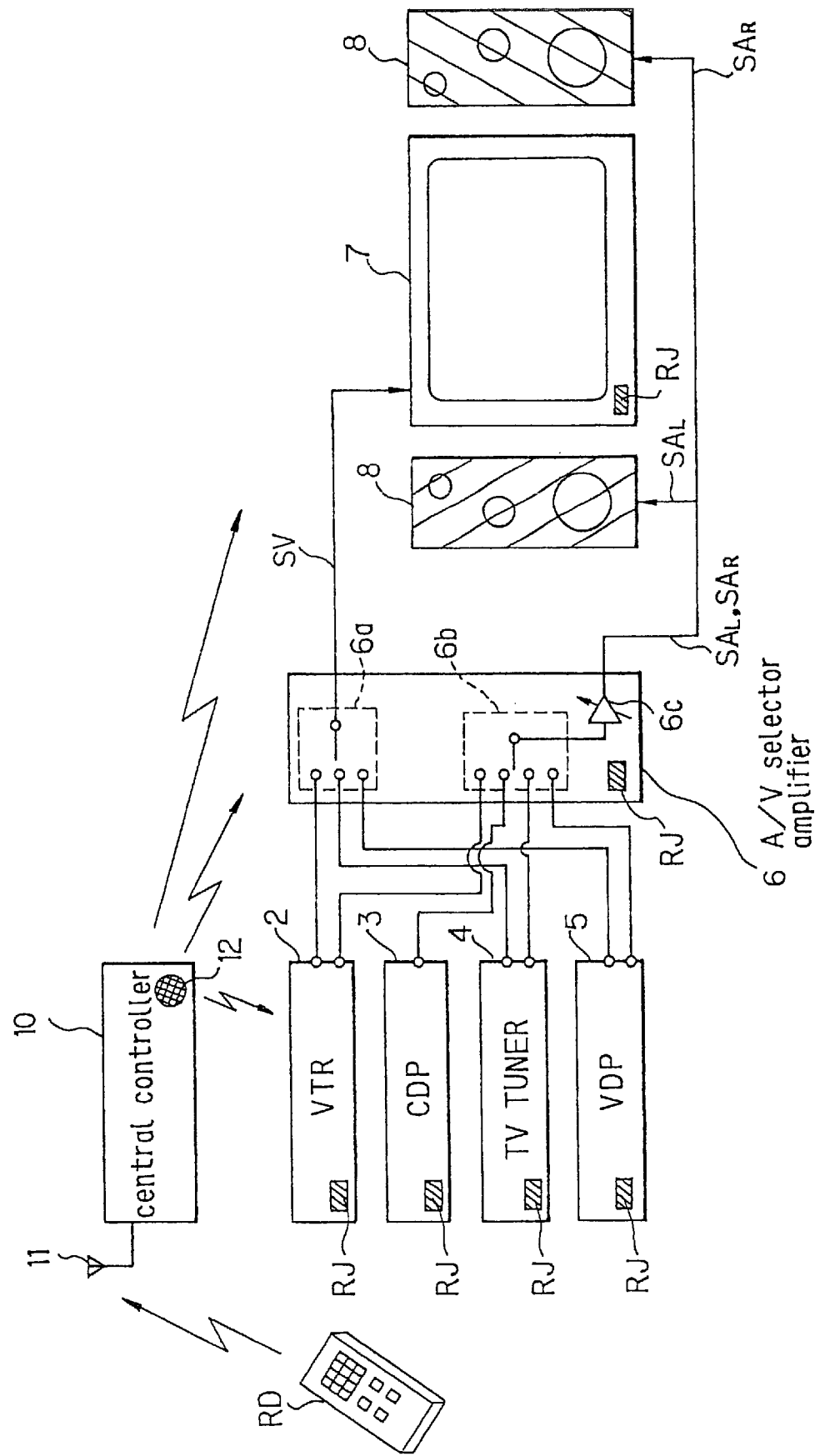
FIG. 3 is a schematic block diagram of a remote control system according a first embodiment of the present invention.

FIG. 3 represents an arrangement of a remote control system according to this first embodiment. It should be noted that this remote control system is employed in an A/V system similar to that shown in FIG. 1, the same reference numerals are employed as those for denoting the same components of FIG. 1, and detailed explanations thereof are omitted.

Reference numeral 10 denotes a central controller which is arranged so as to be able to receive a command signal from a remote commander RD. The remote commander RD is equipped with operation keys corresponding to various operations executed in various electric appliances. The remote commander RD is so constructed that an internal control unit reads a command signal from either a ROM or a RAM in response to the operation key, this command signal is modulated using a predetermined carrier frequency, for instance, is FM-modulated, and the modulated command signal is transmitted as an electromagnetic wave signal.

An antenna unit 11 is provided on the central controller 10, which can receive the electromagnetic wave signal transmitted from the remote commander RD via this antenna unit 11.

An infrared ray transmitting unit 12 is provided with the central controller 10. This central controller 10 decodes a command signal issued from the remote commander RD and received by the antenna unit 11, and produces a further command signal used to control various appliances based upon the decoded command signal. The produced command signal is transmitted from the infrared ray transmitting unit 12 as infrared radiation.

Each of the electric appliances of the VTR 2, the CD player 3, the TV tuner 4, the video disk player 5, the A/V selector amplifier 6, and the CRT monitor 7, has an infrared ray receiving unit RJ. A remote commander is provided along with infrared ray receiving units RJ to enable the receipt of the infrared command signals from the remote commander. Each of these electric appliances is so arranged that, in response to the modulated command signal inputted from the infrared ray receiving unit, an internal system controller including a microcomputer can execute a preselected control.

Figure 4A:
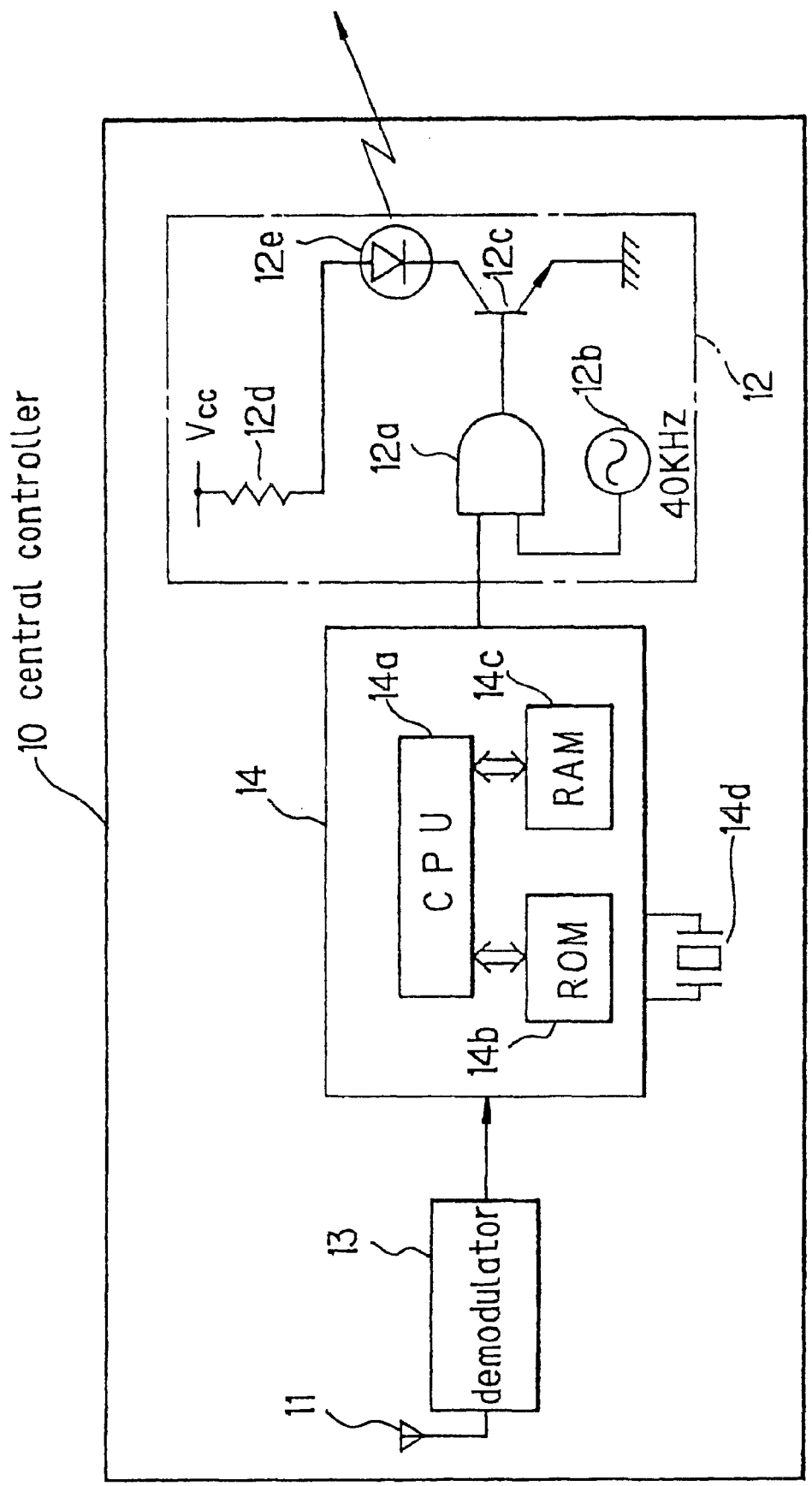
FIGS. 4A and 4B are explanatory diagrams explaining a central controller of the first embodiment of the present invention, FIG. 4A being a schematic block diagram and FIG. 4B being an example of a signal format of a command signal outputted from the central controller.

FIG. 4A indicates an arrangement of the central controller 10. The signal received by the antenna unit 11 is demodulated by a demodulating unit 13 to derive a pulse type command signal.

Thus, a command signal is supplied to a control unit 14. In the control unit 14, reference numeral 14a denotes a CPU, reference numeral 14b indicates a ROM for holding various command signals and operation programs, reference numeral 14c denotes a RAM for holding a command signal and the like, which are input by, for instance, a user, and reference numeral 14d indicates a clock oscillator for producing an operation clock of the control unit 14.

The CPU 14a of the control unit 14 reads either one, or a plurality of predetermined command signals from either the ROM 14b, or the RAM 14c in response to the operation program, and reads out a command signal, or signals from the infrared ray transmitting unit 12. That is, a command signal in the form of a pulse signal is read out from either the ROM 14b, or the RAM 14c and supplied to an AND gate 12a. To the other terminal of the AND gate 12a, a carrier frequency of, for example, 40 KHz is supplied from the oscillator 12b. An output of the AND gate 12a is supplied to a base of a transistor 12c so as to turn ON/OFF this transistor 12c.

In other words, the transistor 12c is turned ON/OFF in accordance with the command signal which has been modulated by the carrier frequency of 40 KHz.

Figure 4B:
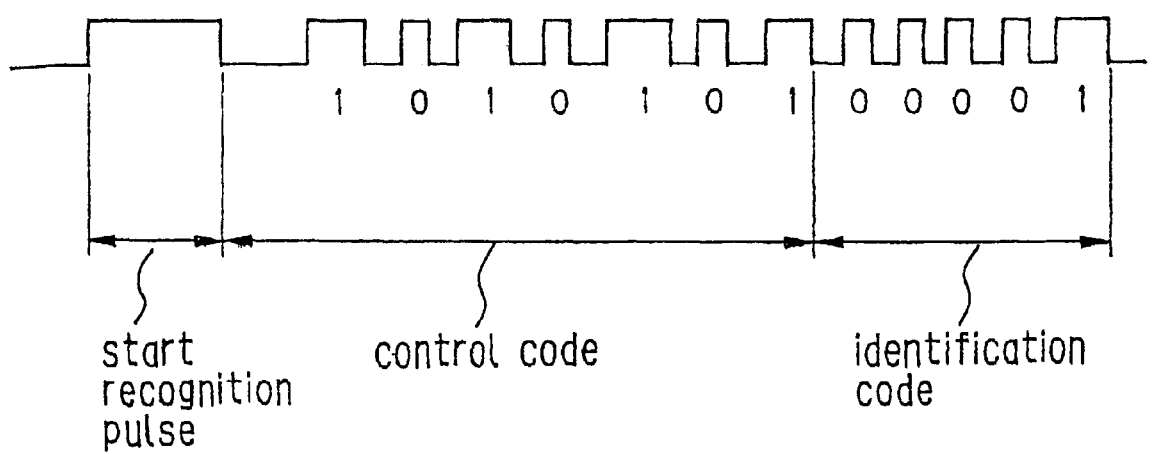

During a period where the transistor 12c is turned ON, a current flows through a resistor 12d into a light emitting diode 12e, so that infrared rays are outputted from the light emitting diode. During a period where the transistor 12c is turned OFF, no infrared rays are outputted from the light emitting diode 12e. In accordance with this operation, the command signal modulated with the carrier frequency of 40 KHz is transmitted from the light emitting diode 12e as the infrared ray signal. This command signal has a format shown in, for example, FIG. 4B. The command signal is constructed of, as represented in FIG. 4B, a start recognition pulse portion, a control code, and an identification code. The start recognition pulse unit indicates that the control code starts from which pulse being received after this start recognition pulse portion. The control code is, for instance, 7-bit digital data, and is to control various operations required for various appliances, e.g., reproducing, fast forward, rewind, and stop operations. The identification code is, for example, 5-bit digital data, and is to specify, or identify an appliance to be controlled. Although FIG. 4B shows an identification code whose pulse width is varied by "1" and "O1" the present invention is not limited thereto.

Thus, the infrared ray command signals outputted from the infrared ray transmitting unit 12 are received by the infrared ray receiving units RJ employed in the respective appliance of the VTR 2, CD player 3, TV tuner 4, video disk player 5, A/V selector amplifier 6, and CRT monitor 7.

Then, the system controller provided in the respective appliances makes a confirmation based upon the identification code that the received command signal is directed to its own system controller, and thereafter performs the operation control instructed by the control data contained in this command signal.

It should be understood that the format and code system of the command signal differs from manufacturers and models. For example, even when a command of "VTR reproduction" used to a VTR supplied from a manufacture "A" is received by another VTR supplied from another manufacture "B", the latter VTR supplied from the latter manufacture "B" does not perform the reproduction operation.

To this end, the command signals of plural sorts of format/code systems corresponding to various sorts of manufacturers and models are stored in either the ROM 14b, or the RAM 14c employed in the central controller 10. Then, when an A/V system is installed, a user sets this A/V system in such a manner that command signals adapted to various electric appliances belonging to this A/V system can be outputted from the central controller 10. As a consequence, there is no limitation in using remotecontrollable appliances whose format/code systems for command signals are different from those of other manufacturers.

An example of operations in the central controller 10 will now be explained with reference to a flow chart of FIG. 5. It should be noted that in the remote commander RD, various operation keys and various command signals corresponding to these operation keys are prepared, by which various operations such as power ON/OFF, reproduction, record, fast forward, and preset tuning a preselected interlocking operation is executed. It should also be noted that as an operation key to execute the interlocking operation, such keys as "VTR", "CD", "TV", "VDP" are employed.

Upon receipt of a command signal sent from the remote commander RD, the control unit 14 of the central controller 10 fetches this command signal (F101) and first judges the content of this command signal. In other words, the central controller 10 judges whether the received command signal corresponds to any one of these command signals "VTR", "CD", "TV", and "VDP", or to any other command signals (F102, F103, F104, F105).

If the received command signal corresponds to none of these command signals "VTR", "CD", "TV", "VDP", but a command signal of each operation unit, then a command signal corresponding to this received signal is read out from the ROM 14b, or the RAM 14c, and is outputted as an infrared signal from the infrared ray transmitting unit 12 (F106).

For instance, when such a command signal as "VTR production" is transmitted from the remote commander RD, the CPU 14a reads out from either the ROM 14b, or the RAM 14c, a command signal indicative of "VTR reproduction" in the format/code system adapted to the VTR 2 connected as the A/V system, and transmits the latter command signal as an infrared command signal. When this infrared command signal is fetched from the infrared ray receiving unit RJ in the VTR 2, the system controller of the VTR 2 performs the reproducing operation control if the VTR 2 is under power-ON state.

On the other hand, when such a command signal preset as the interlocking operation of "VTR", "CD", "TV", "VDP" is entered, the CPU 14a will execute the following process operation.

When the command signal of "VTR" is inputted, the CPU 14a first reads out the command signal of power-ON with regard to the A/V selector amplifier 6, and then transmits this command signal (F107). As a result, the A/V selector amplifier 6 is turned ON. Subsequently, a command signal for instructing that the input selecting function to the A/V selector amplifier 6 is read out and then transmitted (F108). Accordingly, the picture input changing unit 6a in the A/V selector amplifier 6 selects the picture signal from the VTR 2, and the audio input changing unit 6b selects the audio signal from the VTR 2.

Further, subsequently, the CPU 14a reads out another command signal for instructing that the VTR 2 is turned ON, and sends this command signal (F109). Thus, the VTR 2 is turned ON. Next, CPU 14a reads out another command signal for instructing that the CRT monitor 7 is turned ON, and send this command signal (F110). As a result, the CRT monitor 7 is turned ON. Finally, the CPU 14a reads out another command signal for instructing the reproducing operation of the VTR 2, and transmits this command signal (F111). Thus, the reproducing operation is performed in the VTR 2. Under this condition, the picture signal SV and the L-channel and R-channel audio signals $SA_L$, $SA_R$, which are reproduced in the VTR 2, are supplied via the A/V selector amplifier 6 to the CRT monitor 7 and the speaker 8, so that both the picture and sounds reproduced in the VTR are produced. That is, a series of operations are controlled by merely manipulating the key operation to issue the command signal of "VTR" only one time by the user, whereby he can enjoy the reproduced VTR pictures.

When the command signal of "CD" is entered, the CPU 14a first reads a command signal for instructing that the A/V selector amplifier 6 is turned ON, and transmits the read command signal (F112). As a result, the A/V selector amplifier 6 is turned ON. Subsequently, the CPU 14a reads out another command signal for instructing that the input selecting function for the A/V selector amplifier 6 is CD, and transmits this read command signal (F113). As a result, the audio input changing unit 6b in the A/V selector amplifier 6 selects the audio signal derived from the CD player 3.

Further, subsequently, the CPU 14*a* reads out another command signal for instructing that the CD player 3 is turned ON, and transmits this read command signal (F114). As a consequence, the CD player 3 is turned ON. Then, the CPU 14*a* finally reads out another command for the reproducing operation of the CD player 3, and transmits the reproducing command signal (F115). Accordingly, the reproducing operation is carried out in the CD player 3. Under this condition, the L-channel and R-channel audio signals $SA_L$, $SA_R$ reproduced by the CD player 3 are supplied via the A/V selector amplifier 6 to the speaker 8, so that the reproduced sounds are produced.

When the command signal of "TV" is inputted, the CPU 14*a* first reads out a command signal for instructing that the A/V selector amplifier 6 is turned ON, and transmits this command signal (F116). Subsequently, the CPU 14*a* reads out another command signal for instructing that the input selecting function to the A/V selector amplifier 6 is a TV tuner 4, and sends this read command signal (F117). At this time, the A/V selector amplifier 6 is turned ON, so that the picture input changing unit 6*a* and the audio input changing unit 6*b* in the A/V selector amplifier 6 select the picture signal and the audio signal derived from the TV tuner 4.

Further, subsequently, the CPU 14*a* reads out another command signal for instructing that the TV tuner 4 is turned ON, and transmits this read command signal (F118). As a result, the TV tuner 4 is turned ON. Finally, the CPU 14*a* read out another command signal for instructing that the CTR monitor 7 is turned ON, and transmits this read command signal (F119). As a consequence, the CRT monitor 7 is turned ON. At this stage, the television picture and audio signals received by the TV tuner 4 are supplied to the CRT monitor 7 and the speaker 8, respectively, whereby the broadcasting program may be observed.

When the command signal of VDP is entered, the CPU 14*a* first reads a command signal for instructing that the A/V selector amplifier 6 is turned ON, and sends this command signal (F120). Next, the CPU 14*a* reads out another command signal for instructing that the input selecting function to the A/V selector amplifier 6 is the video disk player 5, and transmits this read command signal (F121). At this stage, the A/V selector amplifier 6 is turned ON, and the picture input changing unit 6*a* and the audio input changing unit 6*b* in the A/V selector amplifier 6 will select the picture signal and the audio signal derived from the video disk player 5.

Subsequently, the CPU 14*a* reads out another command signal for instructing that the video disk player 5 is turned ON, and transmits this read command signal (F122). As a result, the video disk player 5 is turned ON. Then, next, the CPU 14*a* reads out a further command signal for instructing that the CRT monitor. 7 is turned ON, and transmits this read command signal (F123). Therefore, the CRT monitor 7 is turned ON.

Finally, the CPU 14*a* reads out another command signal for the reproducing operation of the video disk player 5, and transmits this reproducing command signal (F124). At this stage, both the picture signal and the audio signal, which are produced by the video disk player 5, are supplied to the CRT monitor 7 and the speaker 8, thereby outputting pictures and sounds.

In the remote control system according to the above-described first embodiment, the command signals are transmitted from the remote commander RD as the electromagnetic wave signals to the central controller 10, whereas the command signals by way of the infrared signals are transmitted from the central controller 10 to the respective appliances. As a consequence, the signal transmissions in the two signal systems do not interfere with each other, and therefore, no problem occurs even when the signal transmission from the remote commander R and the signal transmission from the central controller 10 are performed as the same time.

In other words, in the first embodiment, the central controller 10 need not be connected to the respective electric appliances via the control signal lines, such cumbersome system setting operations are no longer required and further such limitation requirements that only the electric appliances capable of responding the control signals are available can be avoided. As previously explained, in the first embodiment, no interference is produced in the signal transmissions of the two signals systems, and the central controller 10 can immediately transmit the command signals upon receipt of the command signals sent from the remote commander RD. Accordingly, a time period defined between the operation of the remote commander RD by the user and the actual operation of the commanded appliance can be considerably shortened. That is, the operation response can be greatly improved, and the remote control system with high performance can be provided.

Furthermore, since no wiring connections are required among the central controller 10 and the respective appliances, for instance, these appliances may be positioned at desirable locations within a room. Since this central controller 10 is employed, not only the respective appliances functioning as the A/V system as shown in FIG. 3, but also other electric appliances which do not belong to this central controller 10 may be remotecontrolled by way of the remote commander RD. For example, an air conditioner, illumination devices and the like, which are installed in the room may also be operated in this centerized control manner.

It should be understood that the above-described electric appliances should be such electric appliances capable of responding to the infrared command signals. If these appliances are capable of responding to the infrared command signals, then the relevant command signals thereto may be stored in the ROM 14*b* by the central controller 10. Otherwise, a user causes the central controller 10 to perform the learning operation with employment of the remote controller for the air conditioner and the like, and the command signal outputted from the remote commander for the air conditioner and the like may be registered in the RAM 14*c*.

On the other hand, the transmissions of the command signals from the central controller 10 to the respective appliances are performed by way of the infrared signals. Therefore, it is preferable to widen infrared transmitting directivity of the central controller 10, and also infrared receiving directivity of each of the electric appliances. This is because a certain limitation is made in the location conditions of the central controller 10 and the respective appliances when both the transmitting directivity and the receiving directivity are not widened.

Figure 6:
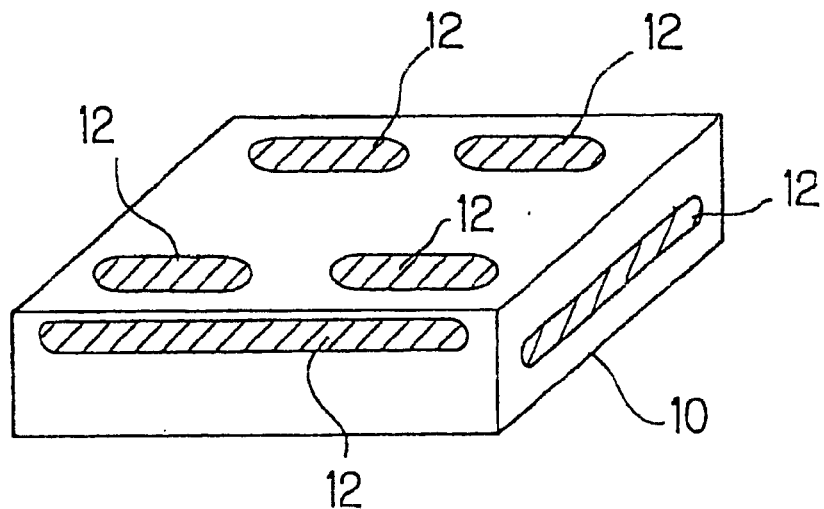
FIG. 6 is an explanatory diagram indicating an example of an infrared ray transmitting unit of the central controller.
Figure 7:
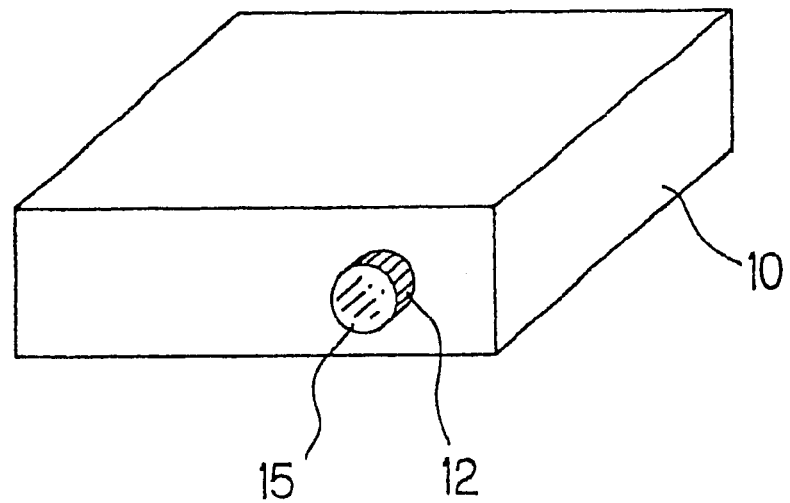
FIG. 7 is an explanatory diagram representing another example of an infrared ray transmitting unit of the central controller.

Thus, to first widen the transmitting directivity in the central controller 10, for instance, a plurality of infrared transmitting units 12 are provided on a front surface, both side surfaces, and an upper surface of a housing of an electric appliance, as illustrated in FIG. 6. Although not shown in this drawing, these infrared transmitting units 12 may be further provided on a lower surface and a rear surface of this housing. As a consequence, the command signals can be transmitted to the electric appliances along the substantially omnidirection.

Alternatively, the directivity may be essentially widened by increasing, to some extent, the output levels of the infrared rays in such a manner that the components of the infrared rays reflected from wall surfaces and furniture of the room can be received at the sufficient signal levels by the respective appliances.

In general, the infrared ray receiving unit is provided on the front surface of the housing of the respective electronic appliances. Further, there is a possibility that these electric appliances in such an A/V system as shown in FIG. 3, are stacked with each other so as to be installed. In this case, there are similar possibilities that the central controller 10 is stacked on these electric appliances. Accordingly, it is preferable to install the central controller 10 from which the infrared rays are emitted on either the lower stage of this central controller 10, or on the upper stage thereof and so that the infrared radiation is directed to the front panels of the appliances.

Thus, it is conceivable that a projection portion 15 is provided on the front surface of the central controller 10, and a large quantity of light emitting diodes 12e are arranged in this projection portion 15. When a knob such as variable resistor is provided a the central controller 10, this knob may be utilized as the projection unit.

Figure 8A:
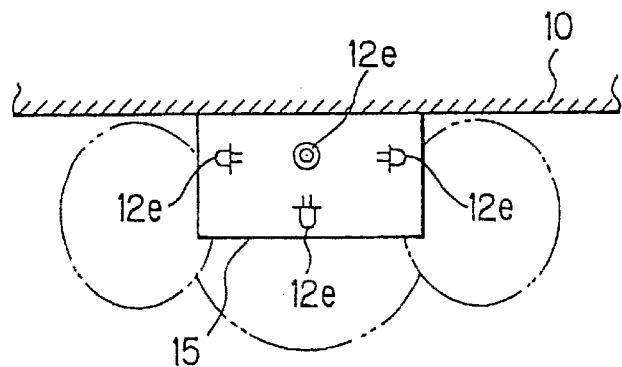
FIGS. 8A to 8C are explanatory diagrams showing transmission directivity of the infrared ray transmitting unit of the central controller represented in FIG. 7, FIG. 8A indicating transmission directivity as viewed above, FIG. 8B showing transmission directivity as viewed from the front, and FIG. 8C denoting transmission directivity as viewed from a side.
Figure 8B:
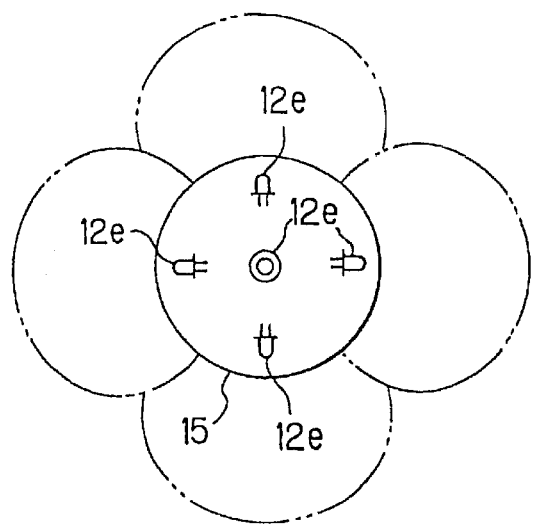
Figure 8C:
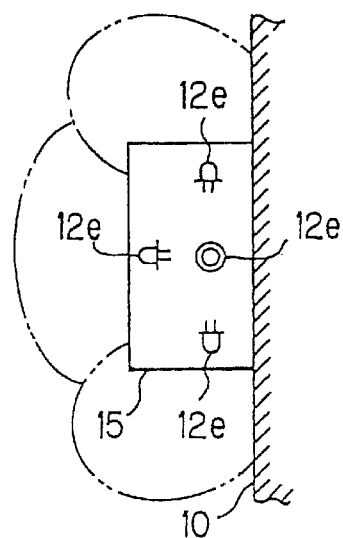

As shown in FIGS. 8A to 8C, four light emitting diodes 12e are arranged in the projection portion 15 at intervals along the circumference direction, and one light emitting diode 12e is arranged on the front surface. Assuming now that the directivity of each of the light emitting diodes 12e covers a range of +45 degrees to 45 degrees, as shown in a dot and dash line of FIG. 8C, the infrared rays can be outputted in an overall range more than 90 degrees with respect to the front surface. As a consequence, the infrared command signal can be effectively irradiated to the front panel of the electric appliance stacked on the upper stage, or the lower stage of the central controller.

Figure 9A:
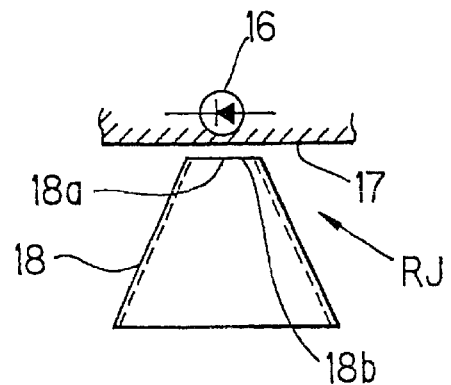
FIGS. 9A to 9C indicate an infrared ray receiving unit of an appliance to be controlled, FIG. 9A showing an infrared ray receiving unit as viewed from above, FIG. 9B representing an infrared ray receiving unit as viewed from the front, and FIG. 9C showing an infrared ray receiving unit as viewed from a side.
Figure 9B:
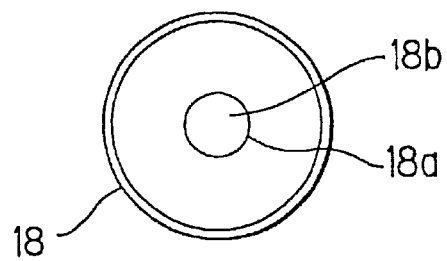
Figure 9C:
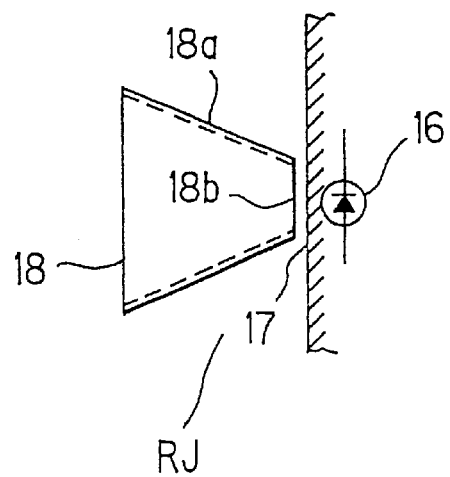

On the other hand, as shown in FIGS. 9A to 9C, the structure of the infrared ray receiving unit RJ in the respective appliances, may be conceived such that a tapershaped cylindrical reflection plate 18 is fixed on a surface of a light transmitting portion 17 provided at the front surface of a light receiving element 16 in such a manner that a center of an edge portion of this reflection plate 18, which has a smaller diameter, is coincident with a center of the light receiving element 16. As the reflection plate 18, a surface of a metal, or a resin which is metal-plated may be used.

Figure 10:
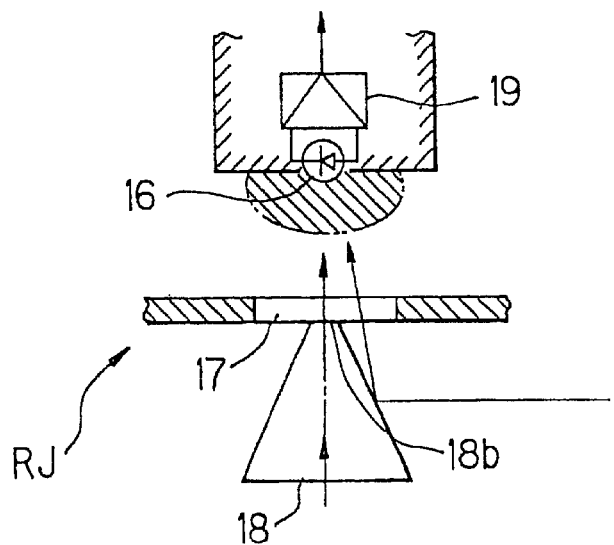
FIG. 10 is an explanatory diagram representing a receiving condition of the infrared receiving unit of the appliance to be controlled shown in FIGS. 9A to 9C.

If the infrared ray receiving unit RJ is arranged in such a manner, as shown in FIG. 10, for instance, when the infrared rays are transmitted from the right direction and in parallel to the housing panel, the infrared rays impinge on the reflection plate 18 and are reflected therefrom, thereby being conducted to the light receiving element 16. Then, an electric signal corresponding to an amount of light detected by the light receiving element 16, is amplified by an amplifier 19, the amplified signal is supplied to a demodulating circuit unit, and fetched as a command signal by this unit.

Figure 11:
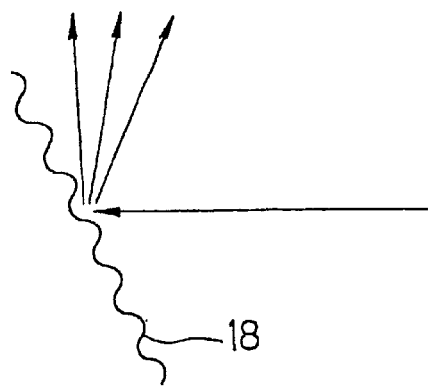
FIG. 11 is a diagram for explaining a surface condition of a reflection plate.

As shown in FIG. 11, since there are formed very fine concaves and convexes on the surface of the reflection plate 18, the infrared rays may undergo irregular reflection, so that the irradiation angle thereof is more or less widened. As a consequence, even if the position and the attitude of the reflection plate 18 is not fixed with high precision, the infrared command signals could reach the light receiving element 16 satisfactorily.

Even when the central controller 10 is arranged in upper or lower positions,or the left and right directions, the infrared command signal transmitted from the central controller 10 can be received (viz., fetched) in a satisfactory condition by utilizing the above-defined structure.

When the infrared rays are incident on the front surface, the infrared rays are conducted via the center hole 18b of the reflection plate 18. As a consequence, the infrared command signals outputted when the central controller 10 is arranged in front surface of the relevant appliance, and the infrared command signals outputted from the remote commander exclusively employed in the relevant appliance may be fetched without any problems.

It should be noted that such a reflection plate 18 may be mounted by the user, and fixed by him, taking account of various conditions such as positional relationships of the central controller 10.

Figure 12:
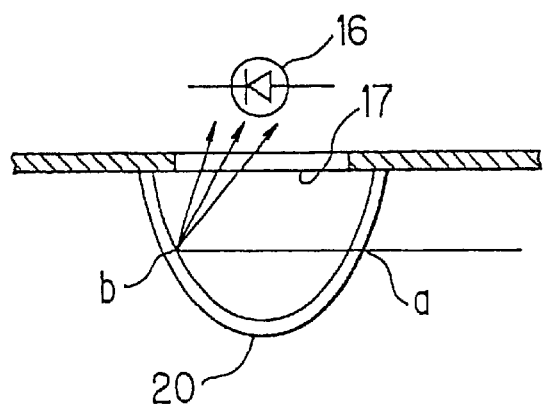
FIG. 12 is an explanatory diagram explaining another example of an infrared ray receiving unit of an appliance to be controlled.

As represented in FIG. 12, the infrared ray receiving unit RJ employed in each of the electric appliances may employ a reflection plate 20 made of a dome-shaped transparent, or semitransparent molding material. In this case, incident light passes through a point "a", causes irregular reflection at a surface of a point "b", and reaches the light receiving element 16. Since at the point "b", the reflection plate 20 is transparent, or semitransparent, most of the light components traveled directly along a straight line. However, a portion of the light components may undergo irregular reflection, and then reach the light receiving element 16. It is of course possible that the light emitted from the front direction passes directly through the reflection plate 20 and impinges on the light receiving element 16.

It should be noted that although the command signals are transmitted from the remote commander RD in the form of electromagnetic waves, whereas the command signals are transmitted from the central controller 10 in the form of infrared rays in this first embodiment, the infrared ray transmission may be performed on one side of the remote commander RD whereas the electromagnetic wave transmission may be performed on the other side of the central controller. In particular, there is such a merit that substantially no problem may occur in the above-described transmission/reception directivity by transmitting the command signals from the central controller to the respective electronic appliances without using specific means.

On the other hand, as previously explained in this embodiment, there is an advantage that since the central controller 10 transmits the command signals in the form of infrared rays, the central controller 10 can easily respond to the conventionally employed electric appliances. Namely, most of the presently available electric appliances employ the infrared ray receiving means. It may be conceived that the command signals may be transmitted by using ultrasonic waves instead of infrared rays.

Referring now to FIG. 13 to FIG. 16, a second embodiment of the present invention will be described.

Figure 13:
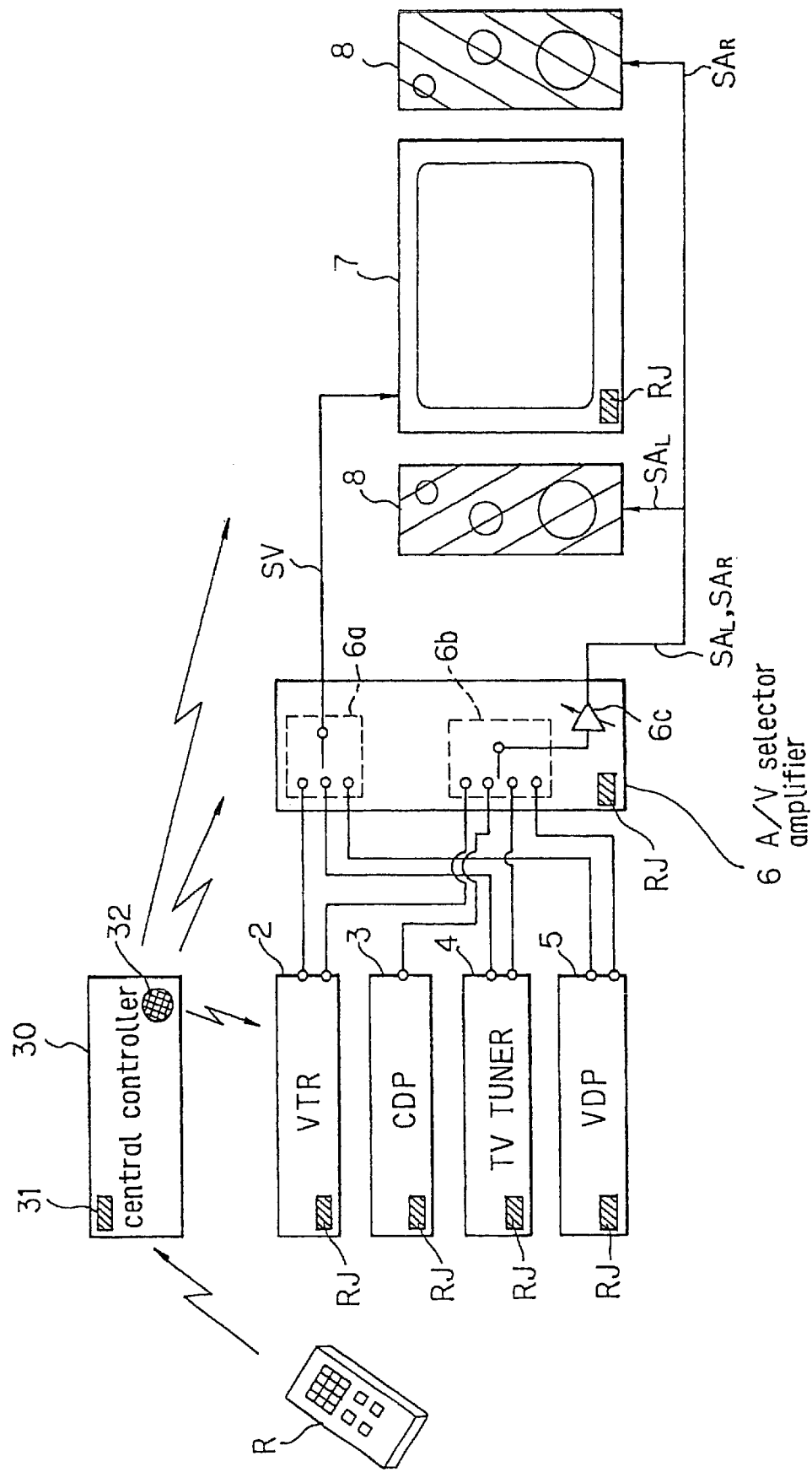
FIG. 13 is a schematic block diagram showing a remote control system according to a second embodiment of the present invention.

FIG. 13 represents an arrangement of a remote control system according to this second embodiment. It should be noted that the same reference numerals shown in FIG. 3 are employed as those for indicating the same components, and detailed explanations thereof are omitted.

Reference numeral 30 indicates a central controller of this embodiment, which is arranged to be able to receive a command signal from a remote commander "R".

Figure 14:
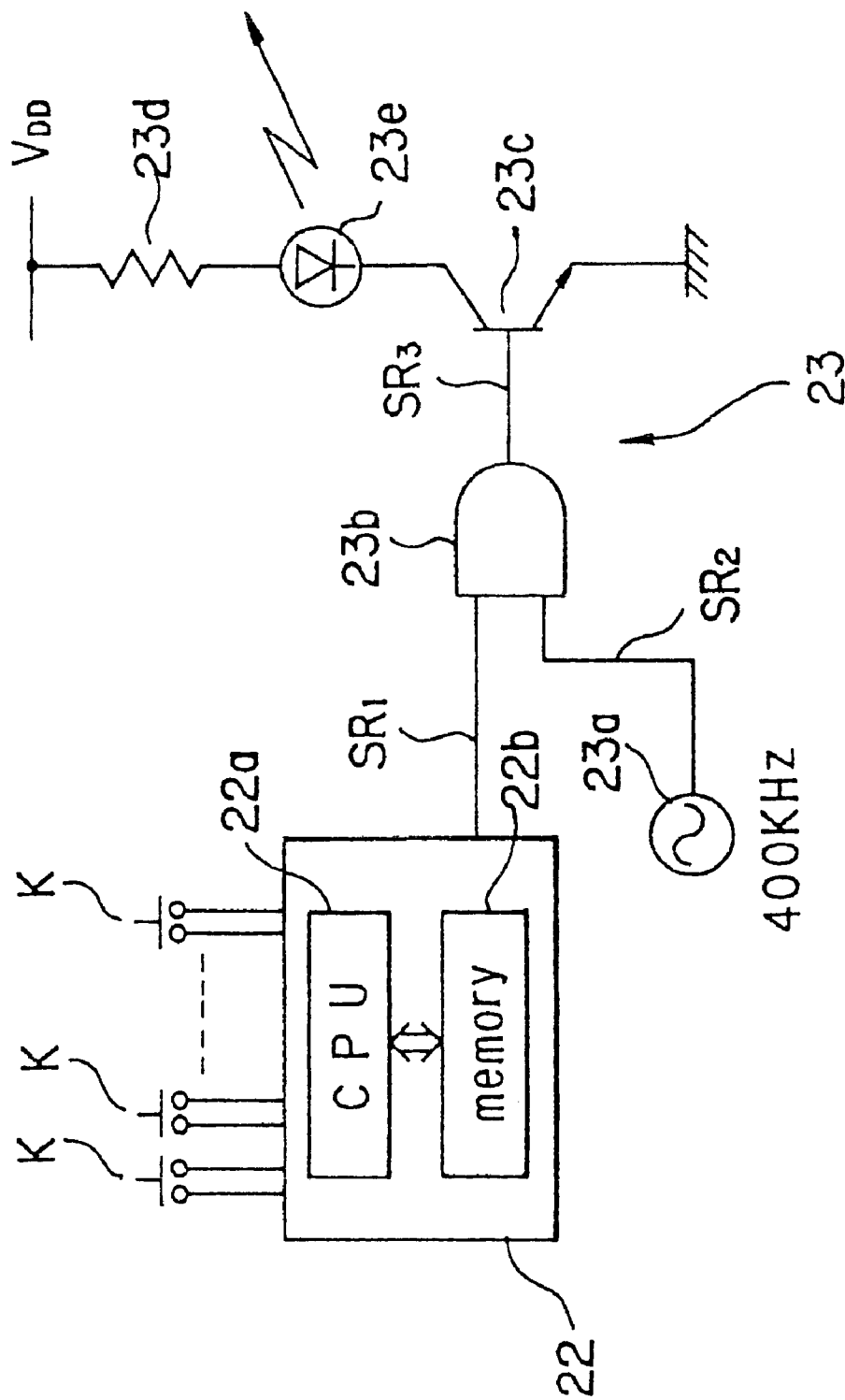
FIG. 14 is a schematic block diagram of a remote commander according to the second embodiment of the present invention.

As represented in FIG. 14, the remote commander R is equipped with operation keys "K" corresponding to various sorts of operations executed in the various electric appliances. Then, the remote commander "R" is so constructed that a CPU 22a of an internal control unit 22 reads out a command signal from either a ROM, or a RAM in response to the operation keys "K", and outputs this read command signal to an infrared ray transmitting unit 23 so as to be modulated with a predetermined carrier frequency, and transmits the modulated command signal as an infrared signal.

In the infrared ray transmitting unit 23 of the remote commander R, reference numeral 23a indicates an oscillator for outputting a carrier frequency having, for example, 400 KHz, and this carrier frequency having 400 KHz is supplied to an AND gate 23b. A command signal as a pulse signal from the control unit 22 is supplied to the AND gate 23b as the other input.

In FIGS. 16a to 16c, there are represented a carrier frequency $SR_2$ of 400 KHz from the oscillator 23a, a command signal $SR_1$ from the controller 22, and an output $SR_3$ from the AND gate 23b.

The output of the AND gate 23b, is a modulated waveform $SR_3$ shown in FIG. 16c which is produced by modulating the command signal of FIG. 16a with the carrier of FIG. 16b. This modulated waveform SR3 is applied to a base of a transistor 23c so as to turn it ON/OFF. That is, the transistor 23c is ON/OFF-controlled based upon the command signal modulated by the carrier frequency of 400 KHz.

In a time period during which the transistor 23c is turned ON, a current flows through a light emitting diode 23e via a resistor 23d, and infrared rays are outputted from the light emitting diode. In a time period during which the transistor 23c is turned OFF, no infrared rays are outputted from the light emitting diode 23e. In accordance with this operation, the command signal modulated by the carrier frequency of 400 KHz is transmitted from the light emitting diode 23e of a remote commander R as the infrared signal.

In correspondence with this structure, an infrared ray receiving unit 31 is provided in the central controller 30, as shown in FIG. 13, and the infrared signal from the remote controller R can be received by this receiving unit 31.

Also, an infrared ray transmitting unit 32 is provided in the central controller 30 to produce a command signal based upon the command signal transmitted from the remote controller R in the form of an infrared ray signal. Then, this produced command signal is supplied to the infrared signal transmitting unit 32, and the command signal is transmitted from the transmitting unit 32 as an infrared signal.

Similar to the respective electric appliances of the first embodiment, an infrared ray receiving unit RJ is provided in each of the electric appliances such as the VTR 2, the CD player 3, the TV tuner 4, the video disk player 5, the A/V selector amplifier 6, and the CRT monitor 7. These electric appliances are so arranged that an internal system controller can execute a predetermined operation control based upon the command signal which has been inputted from the infrared ray receiving unit RJ and demodulated.

Figure 15:
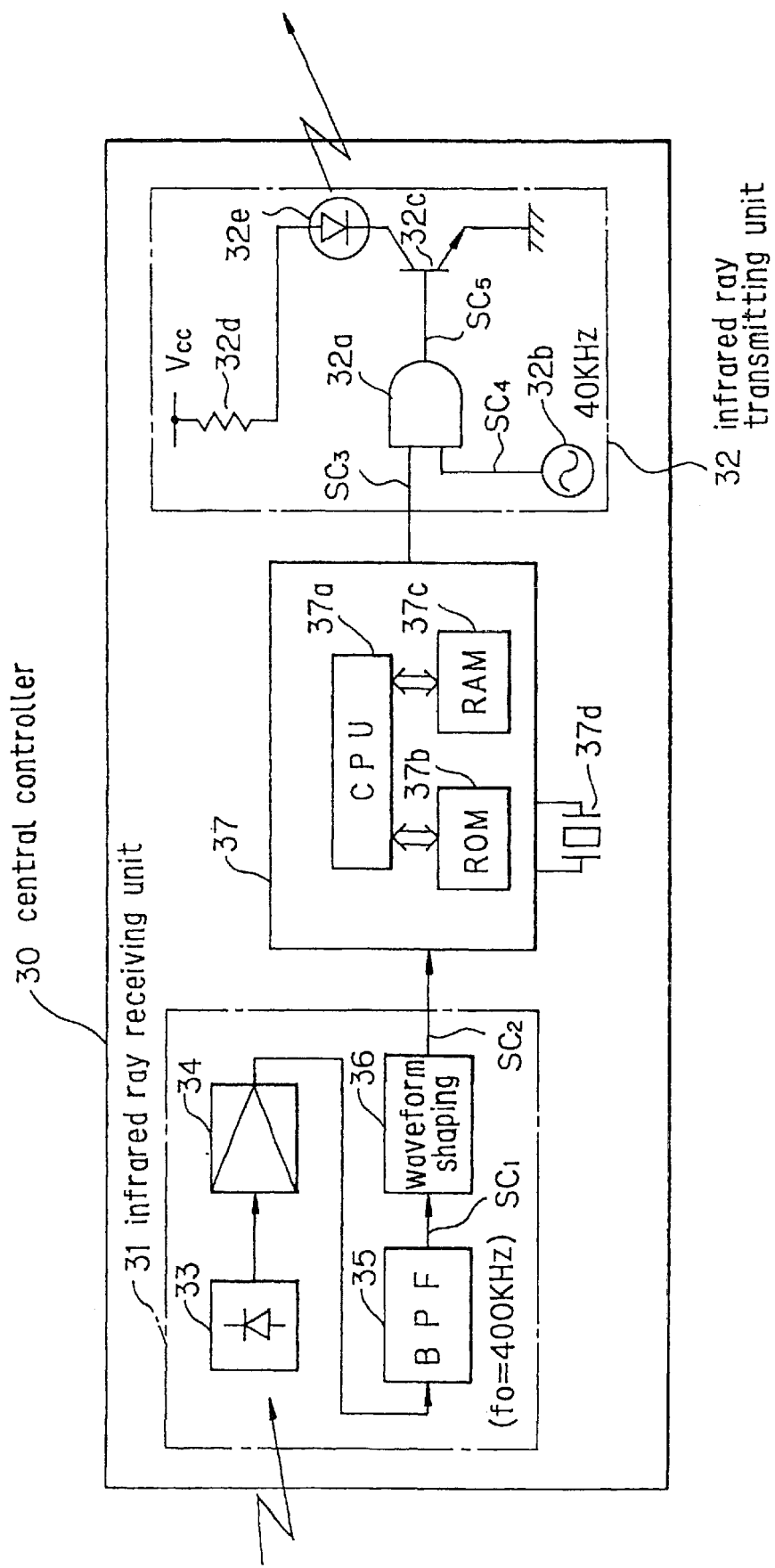
FIG. 15 is a schematic block diagram indicating a central controller according to the second embodiment of the present invention.

In FIG. 15, there is shown an arrangement of the central controller 30. In the infrared ray receiving unit 31, there are provided a light receiving element unit 33 for receiving the infrared rays to output an electric signal in accordance with an amount of the received rays, an amplifier 34 for amplifying the electric signal supplied from the light receiving element unit 33, a band-pass filter 35 whose central frequency has been set to 400 KHz, and a waveform shaping circuit 36.

The infrared command signal outputted in response to the modulated waveform as shown in FIG. 16C is received and detected by the light receiving element unit 33, and is amplified by the amplifier 34. When the amplified command signal is supplied to the band-pass filter 35, the signal component of 400 KHz is extracted by the band-pass filter 35, thereby obtaining a signal SC1 as shown in FIG. 16D. Then, this signal SC1 is waveform-shaped by the waveform shaping circuit 36, and a pulse signal is obtained as s command signal illustrated as a signal SC2 in FIG. 16E.

This command signal is supplied to a controller 37. In the controller 37, reference numeral 37a indicates a CPU, reference numeral 37b denotes a ROM for holding various command signals and operation programs, reference numeral 37c indicates a RAM for holding a command signal and the like, which are learned by the user, and reference numeral 37d indicates a clock oscillator for generating an operation clock of the controller 37.

The CPU 37a of the controller 37 reads out either one, or a plurality of predetermined command signals from the ROM 37b, or the RAM 37c in accordance with the operation program based on the command signal supplied via the waveform shaping circuit 36. The read command signal is supplied to the infrared ray transmitting unit 32, and is transmitted as an infrared signal as the transmitting unit 32.

The command signal read out from either the ROM 37b, or the RAM 37c is supplied to the AND gate 32a. One example of this command signal waveform $SC_3$ is shown in FIG. 16F.

To the other terminal of the AND gate 32a, for example, a carrier frequency of 40 KHz is supplied from the oscillator 32b as shown as a signal SC4 of FIG. 16G.

An output of the AND gate 32a is applied to a base of a transistor 32c, so as to ON/OFF-control the transistor 32a. In other words, the transistor 32c is ON/OFF-controlled by a modulated waveform SC5 of FIG. 164 which is produced by modulating the command signal of FIG. 16F with the carrier frequency of 40 KHz of FIG. 16G.

In a time period during which the transistor 32c is turned ON, a current flows through a light emitting diode 32e via a resistor 32d, and infrared rays are outputted from the light emitting diode 32c. In a time period during which the transistor 32c is turned OFF, no infrared rays are outputted from the light emitting diode 32e. In accordance with this operation, the command signal modulated by the carrier frequency of 40 KHz is transmitted from the light emitting diode 32e as the infrared signal.

Thus, the infrared command signals outputted from the infrared ray transmitting unit 32 are received by the infrared ray receiving unit RJ employed in the respective electric appliances such as the VTR 2, the CD player 3, the TV tuner 4, the video disk player 5, the A/V selector amplifier 6, and the CRT monitor 7. At this time, in the case that the carrier corresponds to the infrared command signal with the frequency of 40 KHz in these appliances the infrared command signal based on a waveform of FIG. 16H is received by the light receiving element and converted into an electric signal. Thereafter, the resultant signal is processed by the bandpass filter whose central frequency is set to 40 KHz, thereby obtaining a waveform of FIG. 16I. Then, this signal is processed by the waveform shaping operation, whereby a pulse signal as shown in FIG. 16J functioning as a command signal can be obtained.

Figure 5:
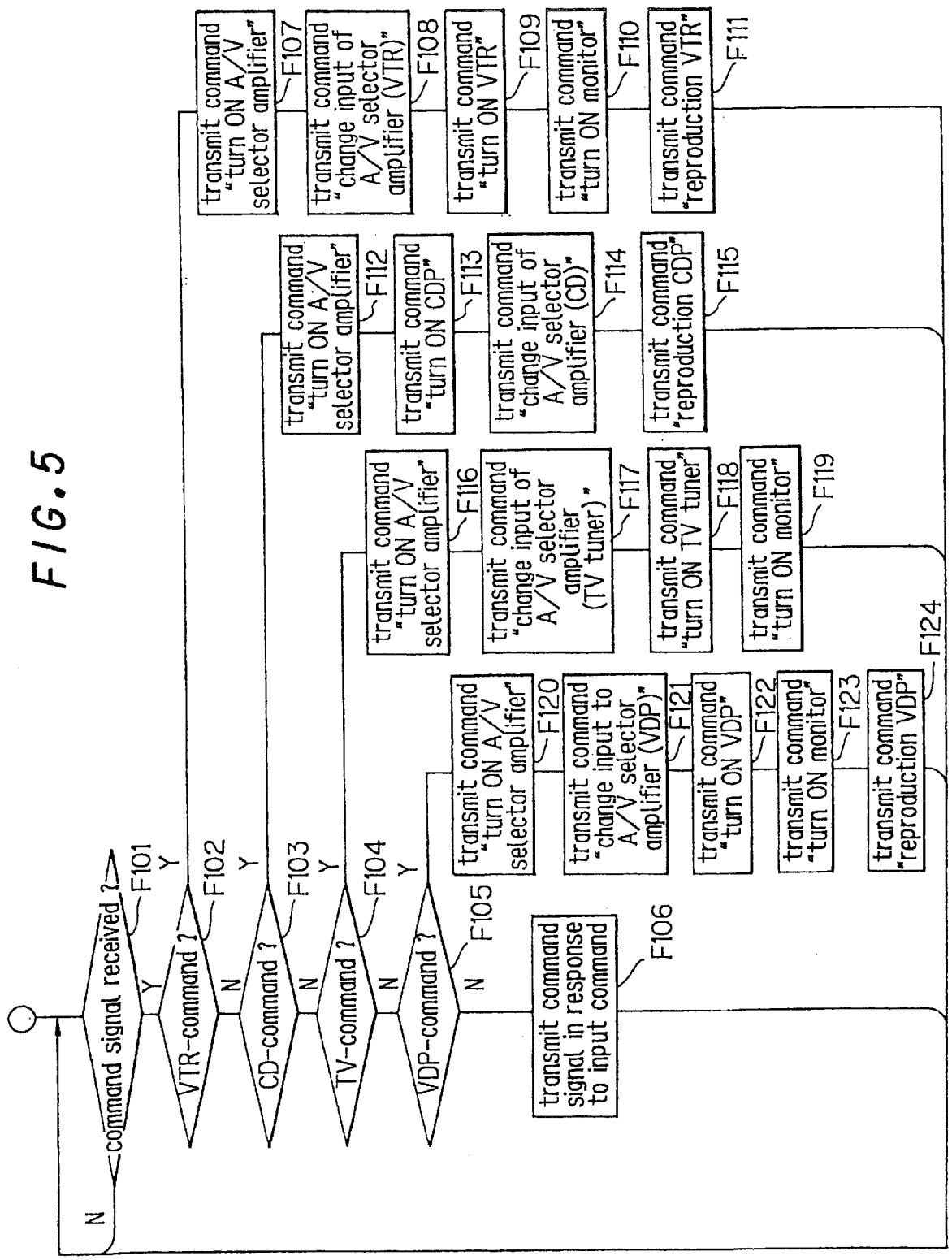
FIG. 5 is a flow chart showing a process operation of the central controller.

It should be noted that the output operation example of the command signals in the central controller 30 in response to the command signal from the remote commander R is similar to that of FIG. 5, and therefore no further explanation thereof is made in this specification. Also, in this embodiment, as to the constructive condition of the infrared transmitting unit 32 employed in the central controller 30 and the constructive condition of the infrared receiving unit RJ employed in the respective appliances, it is preferable to construct the systems as explained with reference to FIGS. 8A to 8C through FIG. 12.

In such a remote control system of the second embodiment, the command signal is transmitted from the remote commander R to the central controller 30 in the form of infrared signal, and also the command signals are transmitted from the central controller 30 to the respective electric appliance in the form of infrared signals. It should be understood that the carrier frequency of the infrared signal transmitted from the remote commander R is set to 400 KHz, whereas the carrier frequency of the infrared signal outputted from the controller 30 is set to 40 KHz.

Then, the command signal is demodulated from the signal component with 400 KHz frequency band by way of the bandpass filter 35 in the central controller 30. In the respective appliances for receiving the infrared command signals transmitted from the central controller 30, the command signals are demodulated from the signal component having 40 KHz frequency band by way of the bandpass filter.

As a consequence, there is no interference between the transmitted signals in two systems. Also, there is no problem even when the transmission of the command signal from the remote commander R and the transmission of the command signal from the central controller 30 are executed at the same time.

It other words, similar to the above-explained first embodiment, no connections of the control signal line among the central controller 30 and the respective appliances are required in accordance with the second embodiment. Furthermore, such a cumbersome system setting operation and also such a limitation in using only such electric appliances capable of responding to the control signal lines can be avoided. As previously stated, since there is no interference between the transmitted signals in two systems, the central controller 30 can immediately transmit the command signal in response to the command signal sent from the remote commander R, so that the time period defined since the user operates the remote commander R until the relevant electric appliance is actually operated, can be considerably shortened.

That is, the operation response can be greatly improved, and the remote control system with high performance may be provided.

Also in this case, the location of the central controller 30 may be arbitrarily determined, and operational controllabilities with respect to various electric appliances may be achieved.

Although the carrier frequencies of the infrared command signals for the two systems are selected to be 400 KHz and 40 KHz in the second embodiment, the present invention is not limited thereto. Any frequencies are available such that carriers do not interfere with each other and can be separated from each other by way of a bandpass filter under better conditions.

If the carriers of the command signals from the central controller 30 to the respective appliances are selected to be lower than, or equal to 100 KHz, for instance, on the order of 30 to 60 KHz, since various types of the presently available electric appliances perform the infrared remote controls by setting the carrier frequencies to the above-explained frequency bands, there is a merit that the present invention may be easily applied to these various types of electric appliance.

On the other hand, the above-described central controllers 10 and 30 may be built within, for example, such an electric appliance as the A/V selector amplifier 6.

A remote control system for improving operabilities thereof according to a third embodiment of the present invention will now be described with reference to FIGS. 17 to 20, in which a central controller is built in another electric appliance, and only three sorts ("up", "down", "enter") of command signals are inputted into this central controller, namely, user operates with a remote controller.

Figure 17:
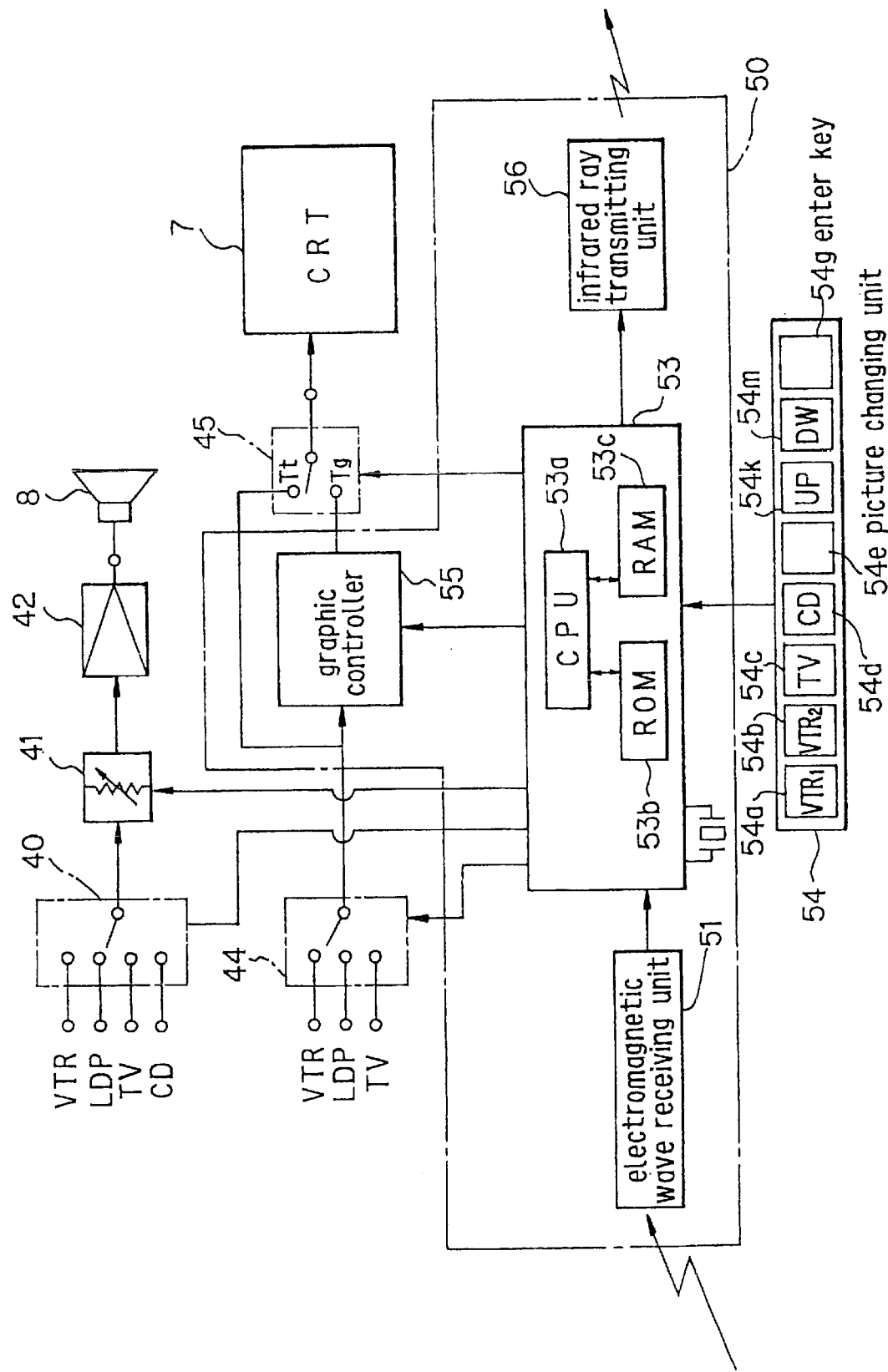
FIG. 17 is a schematic block diagram indicating a central controller according to a third embodiment of the present invention.
Figure 18:
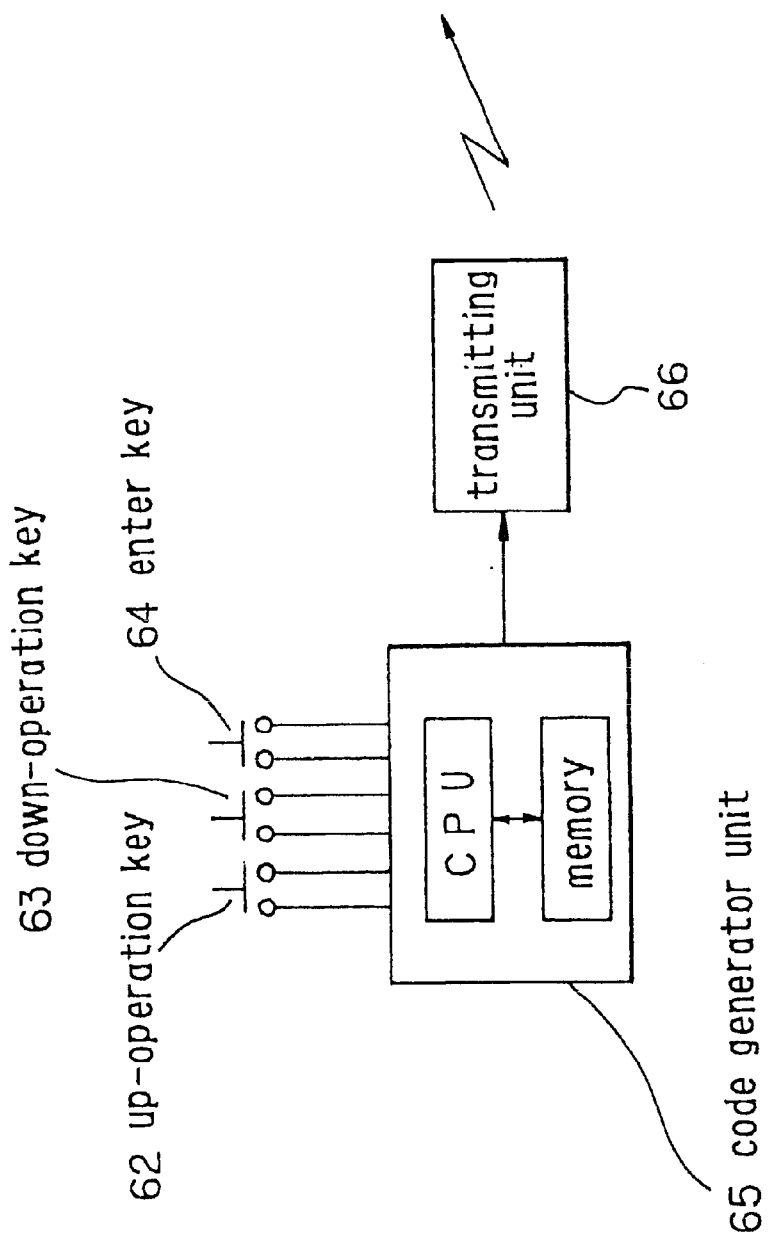
FIGS. 18A and 18B are explanatory diagram explaining a remote commander according to the,third embodiment of the present invention, FIG. 18A showing an outer view of the remote commander, and FIG. 18B being a schematic block diagram for indicating the remote commander.

FIGS. 17 and 18 represent arrangements of the remote control system according to this third embodiment. In this embodiment, the remote control system for A/V appliances is constructed of a remote commander shown in FIGS. 18A and 18B, and a central controller 50 built in, for instance, an A/V selector amplifier as indicated in FIG. 17.

As represented in an outer view of FIG. 18A and an internal block diagram of FIG. 18B, only 3 operation keys of an up-operation key 62, a down-operation key 63, and an enter key 64 are provided on a remote commander 61 as the operation keys.

Reference numeral 65 indicates a code generator unit which is constructed of, for example, a microcomputer having a CPU and a ROM memory. Then, operation information produced by the up-operation key 62, the down-operation key 63, and the enter key 64 is supplied to the code generator unit 65.

In correspondence with the respective operation keys 62, 63, 64, an up-operation command signal, a down-operation signal, and an enter command signal have been stored into the ROM memory of the code generating unit 65. Any one of these command signals is read out in response to the supplied operation information, which will then be supplied to a transmitting unit 66. In the transmitting unit 66, a predetermined modulation process is carried out to the supplied command signal, and the resultant command signal is transmitted to an outside circuit.

On one hand, in the A/V selector amplifier containing the central controller 50 shown in FIG. 17, reference numeral 40 denotes an audio input changing unit for exclusively selecting an audio signal from the audio signals supplied from the VTR 2, the CD player 3, the TV tuner 4, and the video disk player 5, which are connected in such a manner as illustrated in FIG. 3 or FIG. 13. The audio signal selected by the audio input changing unit 40 is supplied via a volume control unit 41 to an amplifier 42. Then, the amplified audio signal is supplied to the speaker 8, thereby outputting sounds.

Reference numeral 44 indicates a picture input changing unit for exclusively selecting a picture signal from the picture signals supplied from the VTR 2, the TV tuner 4, and the video disk player s connected as described above. The picture signal selected from the picture input changing unit 44 is supplied via a picture changing unit 45 to the CRT monitor 7 connected thereto, thereby outputting a picture.

In addition to the above-described functional components as the A/V selector amplifier, a central controller 50 is provided which responds to command signals transmitted from the remote commander 61 and being the position designating information about the up-operation, down-operation, and enter keys.

Reference numeral 51 shows an electromagnetic wave receiving unit for receiving the command signal in the form of electromagnetic wave signal, transmitted from the remote commander 61, to demodulate this received command signal.

Reference numeral 53 shows a control unit constructed of a microcomputer having a CPU 53*a*, a ROM 53*b*, and a RAM 53*c*. The control unit 53 performs a control as various sorts of remote control system in response to the operation information of the remote commander 61 supplied form the electromagnetic wave receiving unit.51, and also functions as a control unit for the A/V selector amplifier (will be discussed later). That is, the control unit 53 executes the selecting controls of the audio input changing unit 40 and the picture input changing unit 44, the volume control of the volume control unit 41, and the selecting control of the picture changing unit 45 in response to the operation input made by the user.

Reference numeral 54 shows an operation unit on which various sorts of operation keys are provided, and the operation information derived from the operation unit 54 is supplied to the control unit 53. On the operation unit 54, there are provided function changing keys (54a, 54b, 54c, 54d) used to execute the changing controls of the audio input changing unit 40 and the picture input changing unit 44, and also a picture changing key 54e, an enter key 54g, the up-operation key 54k, the down-operation key 54m and so on, which are to perform the changing control of the picture changing unit 45.

Reference numeral 55 shows a graphic controller. The graphic controller 55 generates a preselected character picture signal in response to an instruction issued from the control unit 53, superimposes this character picture signal on, for example, a picture signal selected in the picture input changing unit 44, and then supplies the superimposed picture signal via the picture changing unit 45 to the CRT monitor 7. As a display content by a character picture, as illustrated in FIG. 20, there are prepared an operation image SD indicative of operation contents, in accordance with various appliances, a representation such as an arrow (will be referred to a "cursor K" hereinafter) representative of a specific operation content among the operation images SD, as a position designation image, and a representation PD of the appliance which is objected by the operation image SD under display. It should also be noted that as to the cursor "K", not only the above-explained arrow, but also other representing means such that, for instance, a frame of an operation image is moved, or color of an indicated operation image is solely changed into another color, may be employed.

Into the ROM 53b, the RAM 53c of the control unit 53, the control data about the above-explained function components as the A/V selector amplifier, and furthermore, other various command signals with respect to the electric appliances connected to this A/V selector amplifier and other externally provided electric appliances having no relationship with this A/V selector amplifier, have been stored. When one of these command signals is designated by operating the remote commander 61 of the user (will be discussed later), this command signal is read out and supplied to the infrared ray transmitting unit 56.

In the infrared ray transmitting unit 56, a predetermined modulation process is performed to the supplied command signal, and the modulated command signal is transmitted as an infrared signal to an external appliance. For instance, similar to the above-explained infrared ray transmitting units 12 and 32 employed in the first and second embodiments, the infrared signals are outputted in accordance with the command signal modulated by 40 KHz carrier.

A basic operation of the remote control system with such a structure will now be explained with reference to FIGS. 19 and FIG. 20.

Figure 19:
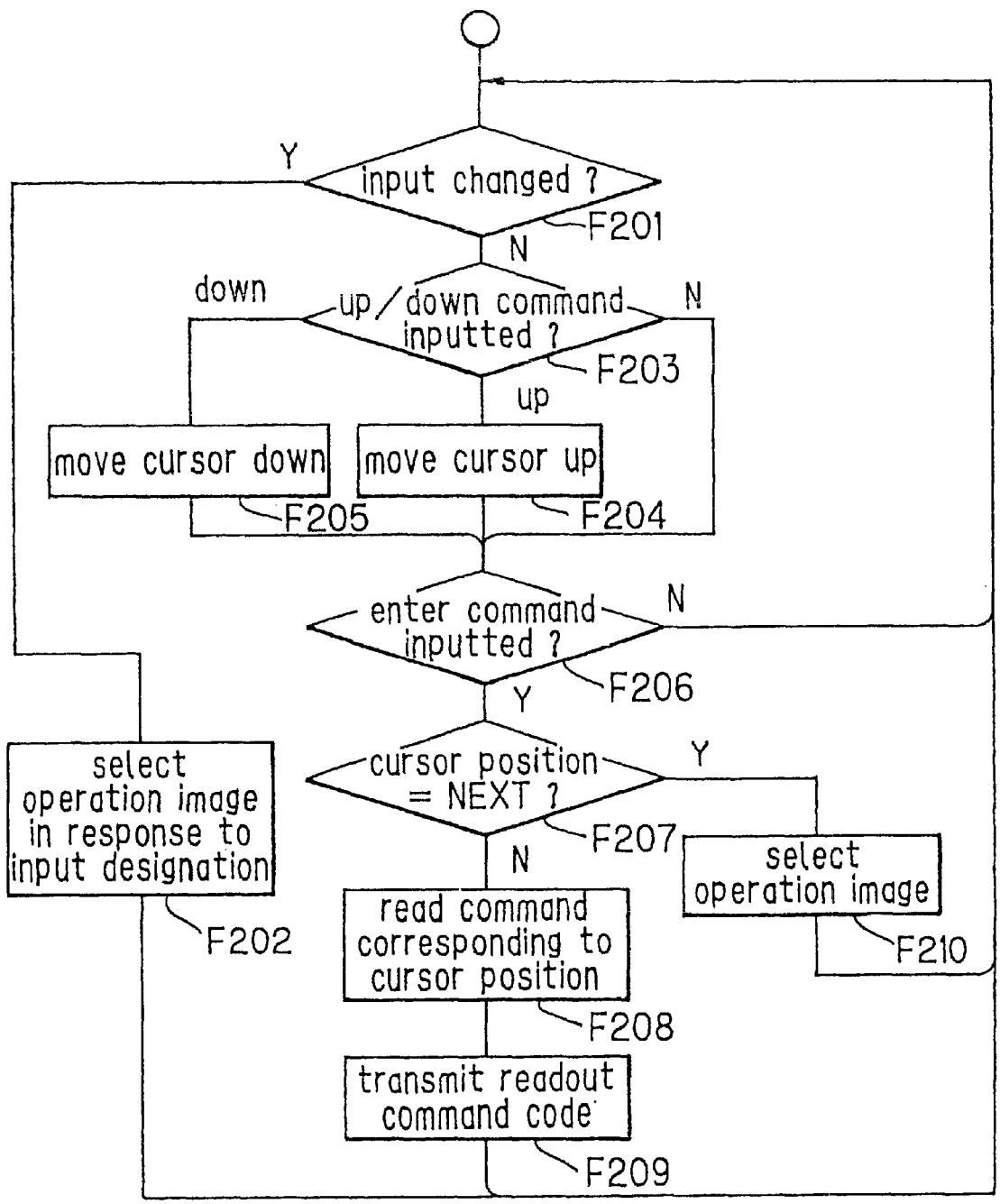
FIG. 19 is a flow chart indicating a process operation of the central controller.

FIG. 19 is a flow chart indicating the operation effected by the control unit 53 based on the position designating information, "up", "down", "enter", transmitted from the remote commander 61, and the operation information produced by the operation unit 54.

The function changing keys 54a to 54d in the operation unit 54 will be described later (F201 to F202). First, a description will be made of operations which occur when the operation information is entered by the remote commander 61.

Figure 20A:
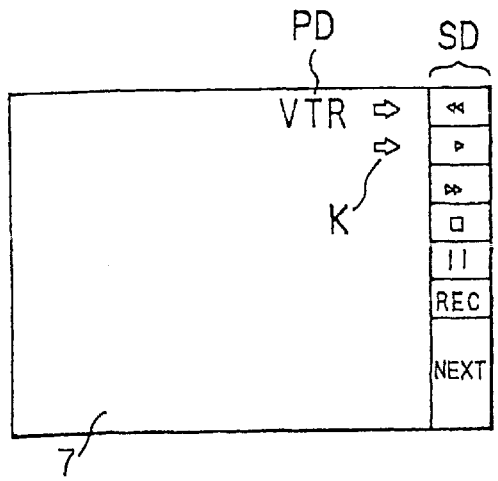
FIGS. 20A to 20E are explanatory diagrams explaining a display operation of a display unit according to the third embodiment of the present invention.
Figure 20B:
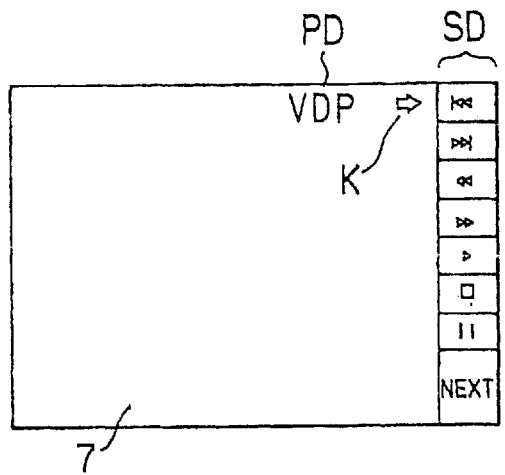

Here, for example, the user manipulates the picture changing key 54e in the operation unit 54 to change the picture changing unit 45 from a terminal "$T_t$" to a terminal "$T_g$" so that an output of the graphic controller 55 is furnished to the CRT monitor 7, and then a representation as shown in FIG. 20A appears. Otherwise, when the user depresses any of the operation keys 62, 63, 64 of the remote commander 61, and the transmitted command signal is received by the infrared ray receiving unit 51, and thereafter fetched into the control unit 53, the picture changing unit 45 is automatically changed from the terminal $T_t$ into the terminal $T_g$ by the control unit 53, so that the output from the graphic controller 55 is supplied to the CRT monitor 7, thereby making a representation as shown in FIG. 20A.

In correspondence with the VTR 2, such operation images as "rewind", "reproduce", "fast forward", "stop", "pause", and "record" are displayed as the operation image SD on the CRT monitor 7. Also, an image of "NEXT" used to change the operation image SD is displayed.

The command signals about "rewind", "reproduce", "fast forward", "stop", "pause", and "record" in correspondence with the VTR 2 have been stored in the ROM 53b, or the RAM 53c employed in the control unit 53.

When the up-operation key 62 is depressed in the remote commander 61, and the up-command signal is received and inputted, the control unit 53 controls the graphic controller 55 in order to move up the display position of the cursor K (F203 to F204). Under the condition shown in FIG. 20, for instance, the cursor K indicates the position of the operation image "reproduce", and this cursor K is moved to the position of the operation image "rewind" as indicated by a dot line. Subsequently, when the up-operation key 62 is depressed, the cursor position is moved from "NEXT" via "record" to "pause" along the up-direction, every time the up-operation key 62 is depressed.

Also, when the down-operation key 63 is depressed in the remote commander 61, and the down-command signal is received and inputted, the control unit 53 controls the graphic controller 55 to move down the display position of the cursor K (F203 to F205). For example, from such a condition that the cursor K of FIG. 20a indicates the position of the operation image "reproduce", the cursor K is moved to the operation image "fast forward". Furthermore, every time the down-operation key 63 is depressed, the cursor position is moved from "stop" via "pause" to "record" along the down direction.

When the user manipulates the enter key 64 to input the enter command into the control unit 53 under such a condition that the cursor K is moved to a desired position by way of the up-command, or the down-command, the control unit judges whether or not the cursor K presently indicates the position of "NEXT" (F206 to F207). If the present cursor position is the position of "NEXT", then a command signal corresponding to the operation image denoted by the cursor K is read out from the ROM 53b, or the RAM 53c (F208).

That is, in the control unit 53, coordinate data corresponding to the display regions of these various operation images displayed on the display screen of the CRT monitor 7 are stored, and furthermore the CPU 53a manages the position of the cursor K moved on this coordinate system in response to the up-command, or the down-command. Then, the control unit 53 judges that the coordinate position presently designated by the cursor K has been designated as the operation content by entering the enter command, and then reads out a command signal which has been stored as the command signal corresponding to this coordinate position.

Then, for example, when at such a position of the cursor K as indicated by a solid line of FIG. 20A, the enter command is inputted, the CPU 53a reads out a command signal indicative of "VTR reproduce" from the ROM 53b, or the RAM 53c, and then supplies the command signal into the infrared ray transmitting unit 56 (F209), whereby this command signal is transmitted as a modulated signal in the form of infrared signal. Thus, the transmitted command signal is received by the VTR 2 positioned around the A/V selector amplifier of FIG. 17, and the reproducing operation is performed in this VTR 2 as shown in FIG. 3 and FIG. 13.

When the enter command is inputted into the control unit 53 while the cursor K indicates the position of "NEXT", the control unit 53 controls the graphic controller 55 to change the operation image (F207 to F210). For example, in FIG. 20A, when the operation image for the VTR is displayed, the screen representation is changed from this operation image into the operation image SD with regard to the video disk player 5 shown in FIG. 20B, so that various operation images corresponding to the video disk player 5, such as "leading of previous music head", "leading of succeeding music head", "fast feed", "fast return", "reproduce", "stop", "pause", and also the image of "NEXT" are represented. It is of course preferred that the command signals corresponding to these images have been stored in the ROM 53b, or the 53c in the control unit 53.

When the cursor K is moved to a predetermined position by way of the up-command, or the down-command on this screen, and the enter command is inputted, a command signal similarly designated with respect to the video disk player 5 is read out by the control unit 53 and is transmitted as the infrared signal.

Figure 20C:
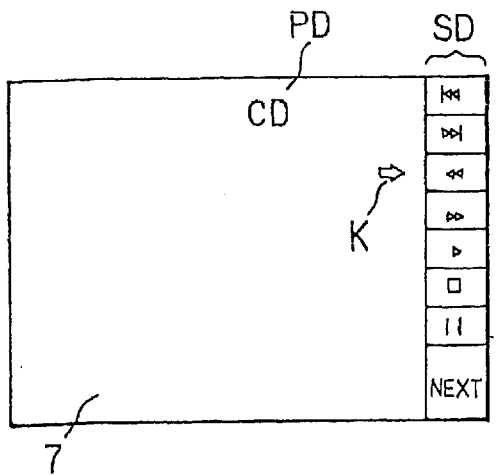

Furthermore, the screen representation is changed into the operation image SD for the CD player 3 of FIG. 20C by inputting the command of "NEXT", so that various operation images such as "leading of previous music head", "leading of succeeding music head", "fast return", "fast feed", "reproduce", "stop", "pause", and the image of "NEXT" are displayed in response to various operations of the CD player 3.

Figure 20D:
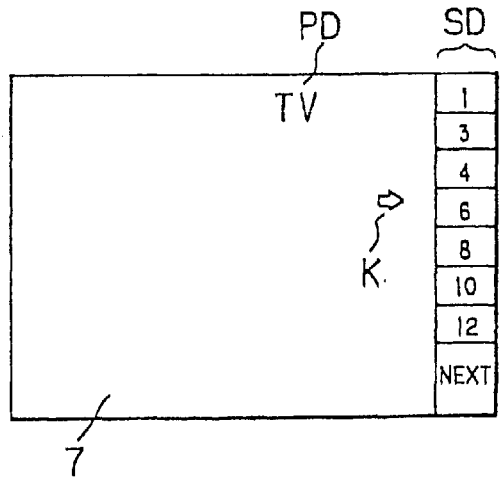

If the command "NEXT" is entered from the operation images for the CD player 3, then the present operation images are changed into the operation images of the channel operation with regard to the TV tuner 4 of FIG. 20d. In addition, the command "NEXT" is entered, so that the operation images SD for the A/V selector amplifier as shown in FIG. 20E are displayed.

Accordingly, the input function changing operation and the images corresponding to the operations of volume up/down are displayed.

Figure 20E:
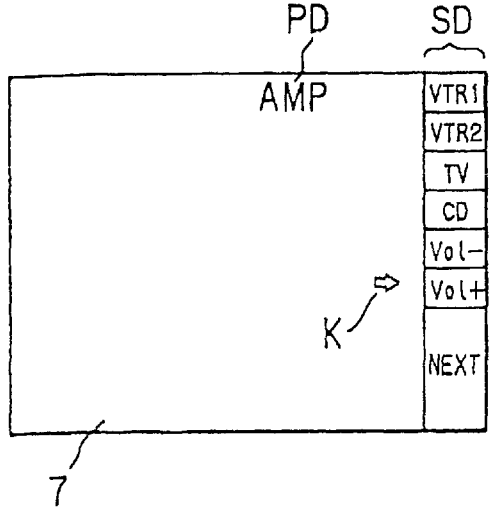

Furthermore, when the command "NEXT" is entered from the image representation of FIG. 20E, the images corresponding to the VTR as shown in FIG. 20A are returned.

Here, it should be noted that when any one of these function changing keys 54a to 54d is operated in the operation unit 45, the control unit 53 controls to select the audio input changing unit 40 and the picture input changing unit 44. In this case, the operation images SD are changed into such operation images with regard to the selected appliances (F201 to F202).

All of the various sorts of command signals used to the various electric appliances which correspond to the respective operation images as shown in FIGS. 20A to 20E, have been stored into either the ROM 53b, or the RAM 53c. In response to the above-described operations, the command signals corresponding to the operation contents designated by the cursor K are read out, and then are transmitted to either an external electric appliance, or an internal electric appliance (F209).

It should be noted that as to the operation of FIG. 20E, that the function change between the audio input changing unit 40 and the picture input changing unit 44, or the volume up/down operation for the volume control unit 41, is directly controlled by the control unit 53 in the third embodiment. When these operations are entered, the control signal pulses generated by the CPU 53a, based upon the read command signals, are directly supplied to the audio input changing unit 40 and the picture input changing unit 44, or the volume control unit 11.

In such a remote control system, when the user operates the remote commander 61 to move the cursor K while observing the screen of the CRT monitor 7, and then depresses the enter key 4 at a desired position, various operations can be performed by the various electric appliances. Accordingly, the key operations for the remote commander 61 can be made very simple.

In particular, the number of operation keys employed in the remote commander 61 is 3 in this case, so that troublesome key operations caused by increasing the number of operation keys can be perfectly solved, and furthermore the key operations can be made simple, because the user can manipulate the operation keys while observing the display screen.

There is another merit that since the command signal are transmitted from the remote commander 61 in the form of electromagnetic waves, the remote commander 61 may be operated irrespective of the direction in which the remote commander 61 is pointed. In addition, a similar effect as in the first and second embodiments can be achieved that since the command signals are outputted from the central controller 50 to the other appliance in the form of infrared rays in a similar manner to that of the first and second embodiments there is no risk of interference.

It is preferable to control such a remote control system that since the display of the operation image SD during the time other than the operation may become cumbersome, the control unit 53 automatically changes the picture changing unit 45 into the terminal "$T_t$" unless the command signal is inputted from the remote commander 61 even after the operation by the remote commander 61 has been complete and a preselected time period has elapsed. Also, the representations of the operation images SD and the cursor K may be realized by way of a so-called "child screen system", or a superimposing system.

Moreover, in case of such a remote control system, the remote commander may output 3 sorts of command signals. For instance, any other remote commanders may be available such that an angular sensor and an acceleration sensor may be employed to detect vibrations of this remote commander by the user in all directions, thereby producing command signals; a mouse may be employed to output a command signal functioning as movement information caused by rotating a track ball, and a shuttle ball may be employed so as to produce such a command signal.

Also, in this remote control system, the command signals from the remote commander to the central controller 50 may be transmitted in the form of infrared rays. In this case, it is apparent that the carrier frequency of this infrared command signal transmitted from the remote commander is sufficiently separated from that of the infrared command signal outputted from the central controller 50.

While the various embodiments have been described in the above description, the remote control system of the present invention is not limited to these embodiments, but may be modified without departing from the gist of the present invention.

What is claimed is:

1. A remote control system comprising:

a remote commander for wirelessly transmitting a first command signal in accordance with a user operation, the first command signal having a first carrier frequency;

control means including a receiving unit for receiving said first command signal as transmitted directly from said remote commander; and a transmitting unit, connected to said control means, for wirelessly transmitting a second command signal having a second carrier frequency, different than said first carrier frequency, directly to a selected appliance, said second command signal controlling operation of said selected appliance in response to said user operation;

wherein said first and second command signals do not interfere with each other even though wirelessly transmitted through an operational range of common space in the vicinity of said selected appliance, a selecting apparatus having a receiving unit for receiving the second command signal, said selecting apparatus being connected among a plurality of appliances, each of which output at least one of an audio or video signal, and a speaker and a video monitor, said selecting apparatus selectively supplying a signal or signals from one of said plurality of appliances to said speaker or video monitor in response to said second command signal.

2. A remote control system as claimed in claim 1, wherein said first and second command signals are both wirelessly transmitted using radio waves.

3. A remote control system as claimed in claim 1, wherein said selecting apparatus and said selected appliance are both controlled by said second command signal in response to a single user operation.

\* \* \* \* \*